US011802810B2

(12) United States Patent
Xia et al.

(10) Patent No.: US 11,802,810 B2
(45) Date of Patent: Oct. 31, 2023

(54) SYSTEMS AND METHODS FOR DETERMINING FIBER CABLE GEOGRAPHIC LOCATIONS

(71) Applicant: Verizon Patent and Licensing Inc., Arlington, VA (US)

(72) Inventors: Tiejun J. Xia, Richardson, TX (US); Glenn A Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/813,269

(22) Filed: Mar. 9, 2020

(65) Prior Publication Data

US 2021/0278314 A1 Sep. 9, 2021

(51) Int. Cl.
*G01M 11/00* (2006.01)
*G01H 9/00* (2006.01)

(52) U.S. Cl.
CPC ........ *G01M 11/3145* (2013.01); *G01H 9/004* (2013.01)

(58) Field of Classification Search
CPC ............. G01M 11/31; G01M 11/3109; G01M 11/3145; G01H 9/004
See application file for complete search history.

(56) References Cited

U.S. PATENT DOCUMENTS

| 6,710,862 B1 * | 3/2004 | Wilson ............... G01M 11/3145 356/73.1 |
| 7,800,743 B1 | 9/2010 | Huffman et al. |
| 8,937,713 B2 * | 1/2015 | Huffman ............ G01M 11/3109 356/73.1 |
| 10,075,232 B1 | 9/2018 | Salgueiro et al. |
| 10,650,648 B2 | 5/2020 | Englund |
| 2007/0264012 A1 | 11/2007 | Healey et al. |
| 2008/0085114 A1 * | 4/2008 | Nakajima ............ H04B 10/071 398/33 |

(Continued)

FOREIGN PATENT DOCUMENTS

| EP | 3531078 A1 * | 8/2019 | ............... B61L 1/166 |
| JP | 2010008143 A * | 1/2010 | ........ G01M 11/3145 |

OTHER PUBLICATIONS

"Verizon and NEC just made fiber sensing a whole lot easier", Verizon News Release, for immediate release Oct. 7, 2019.

(Continued)

*Primary Examiner* — Rufus L Phillips

(57) ABSTRACT

A device may receive, from a sensor device, cable distance data identifying cable distances along the fiber cable to vibrations experienced by the fiber cable from a vibration device. The device may receive location data identifying geographic coordinates associated with the vibrations, and may correlate the cable distance data and the location data to generate correlated data. The device may receive, from the sensor device, data identifying a cable distance along the fiber cable to an alarm condition associated with the fiber cable, and may determine geographic coordinates associated with the alarm condition based on the correlated data and the data identifying the cable distance along the fiber cable to the alarm condition. The device may perform actions based on the geographic coordinates associated with the alarm condition.

20 Claims, 23 Drawing Sheets

(56) References Cited

U.S. PATENT DOCUMENTS

| | | | |
|---|---|---|---|
| 2008/0144016 A1* | 6/2008 | Lewis | G01D 5/35364 |
| | | | 356/73.1 |
| 2009/0326802 A1* | 12/2009 | Johnson | G08G 1/096811 |
| | | | 707/999.107 |
| 2014/0111795 A1* | 4/2014 | Barnhart | G01M 11/3145 |
| | | | 356/73.1 |
| 2015/0098673 A1 | 4/2015 | Barfoot et al. | |
| 2016/0061690 A1* | 3/2016 | Elkins, II | G01M 11/30 |
| | | | 356/73.1 |
| 2016/0209315 A1* | 7/2016 | Tanabe | G02B 21/0084 |
| 2017/0146409 A1 | 5/2017 | Hadley | |
| 2019/0197846 A1 | 6/2019 | Englund | |
| 2020/0124735 A1 | 4/2020 | Huang et al. | |
| 2020/0191613 A1 | 6/2020 | Englund | |
| 2020/0200592 A1 | 6/2020 | Huang et al. | |
| 2020/0313763 A1 | 10/2020 | Wang et al. | |

OTHER PUBLICATIONS

Huang, et al., "First Field Trial of Distributed Fiber Optical Sensing and High-Speed Communication Over an Operational Telecom Network", Journal of Lightwave Technology, vol. 38, No. 1, Jan. 1, 2020, pp. 75-81.

Wellbrock, et al., "First Field Trial of Sensing Vehicle Speed, Density, and Road Conditions by Using Fiber Carrying High Speed Data", 2019 Optical Fiber Communications Conference and Exhibition (OFC), IEEE, pp. 1-3.

* cited by examiner

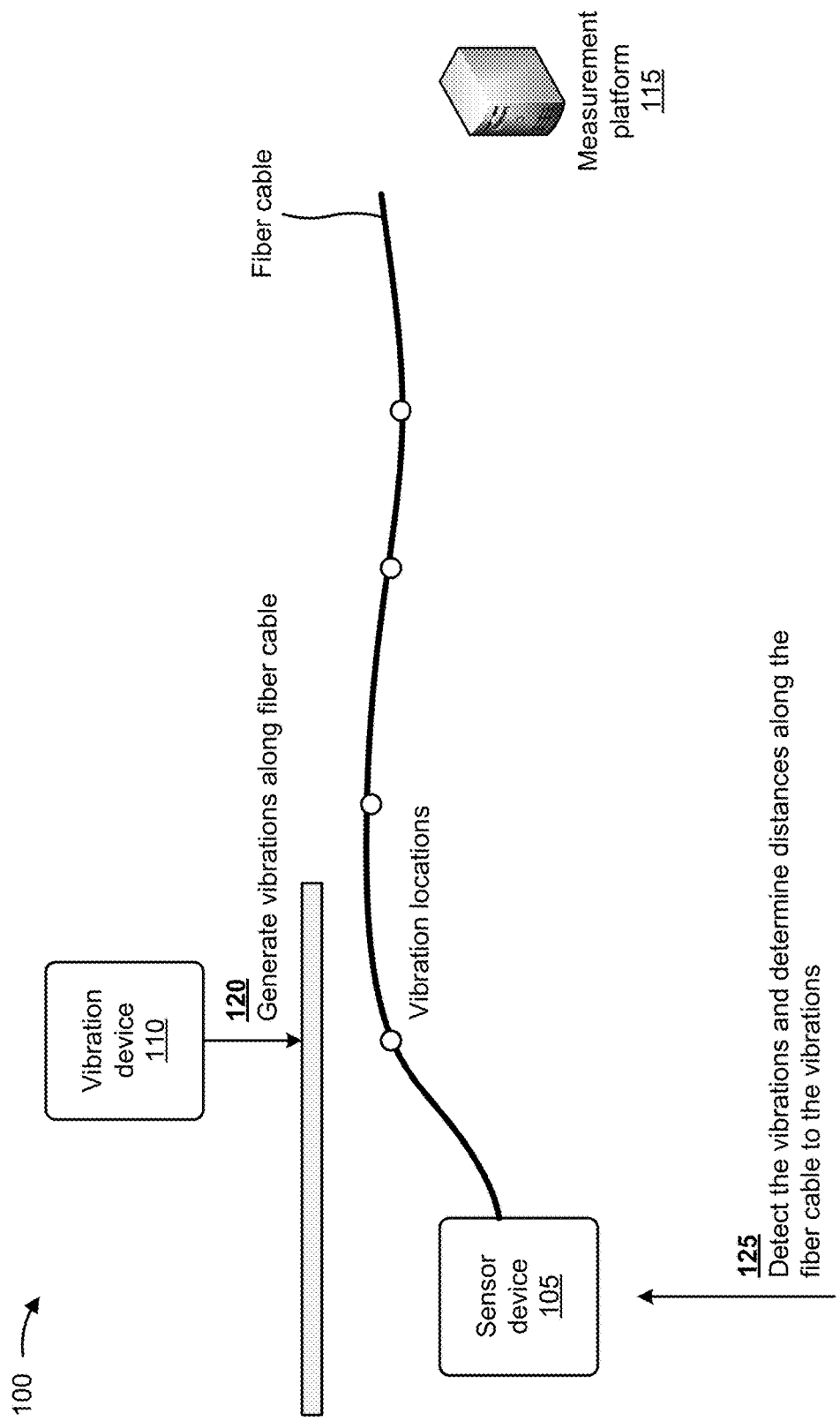

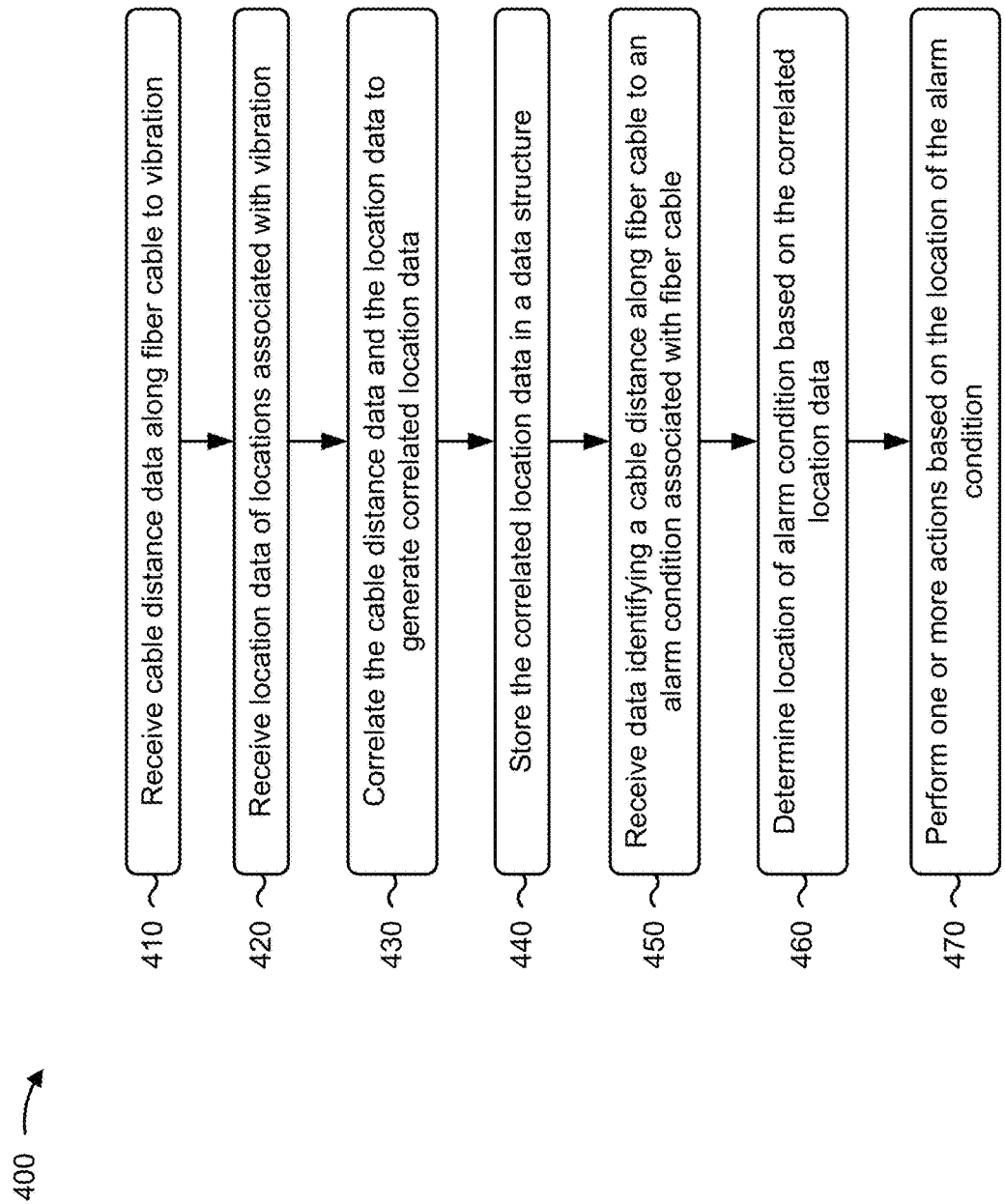

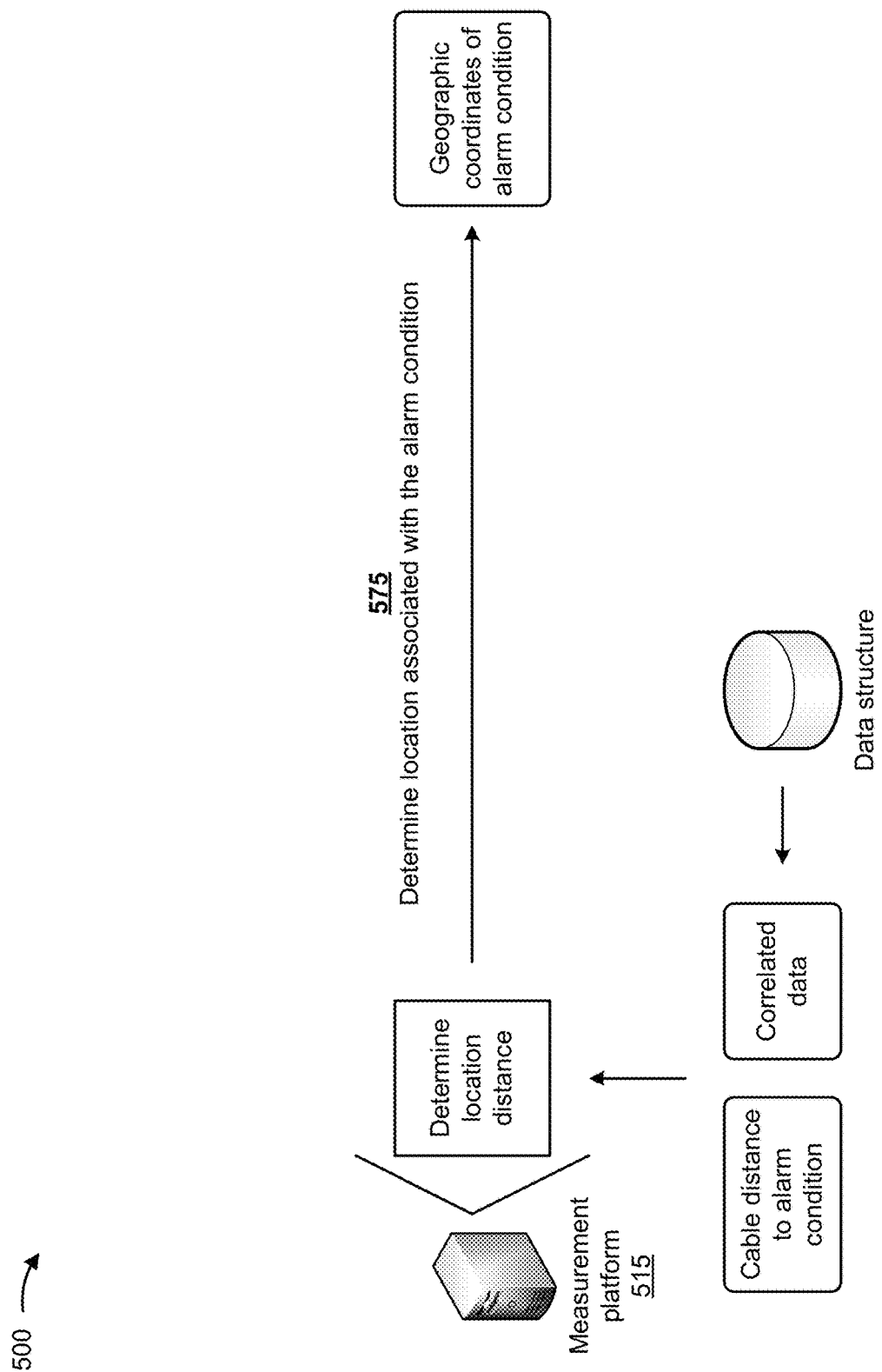

SYSTEMS AND METHODS FOR DETERMINING FIBER CABLE GEOGRAPHIC LOCATIONS

BACKGROUND

To maintain an integrity of deployed fiber cables, network service providers need to repair fiber cable problems in the field, such as a fiber cut, high loss splice points, tightly bending points, and/or the like. When a deployed fiber cable experiences a fault (e.g., a fiber cut), a field technician may be deployed to correct the issue. The field technician needs to identify a location of the fault quickly so that the field technician may travel to the location and correct the fault in the fiber cable.

BRIEF DESCRIPTION OF THE DRAWINGS

FIGS. 1A-1G are diagrams of one or more example implementations described herein.

FIG. 4 is a flow chart of an example process for identifying locations of deployed fiber cables based on vibrations.

FIGS. 5A-5H are diagrams of one or more other example implementations described herein.

DETAILED DESCRIPTION OF PREFERRED EMBODIMENTS

Figure 1B:
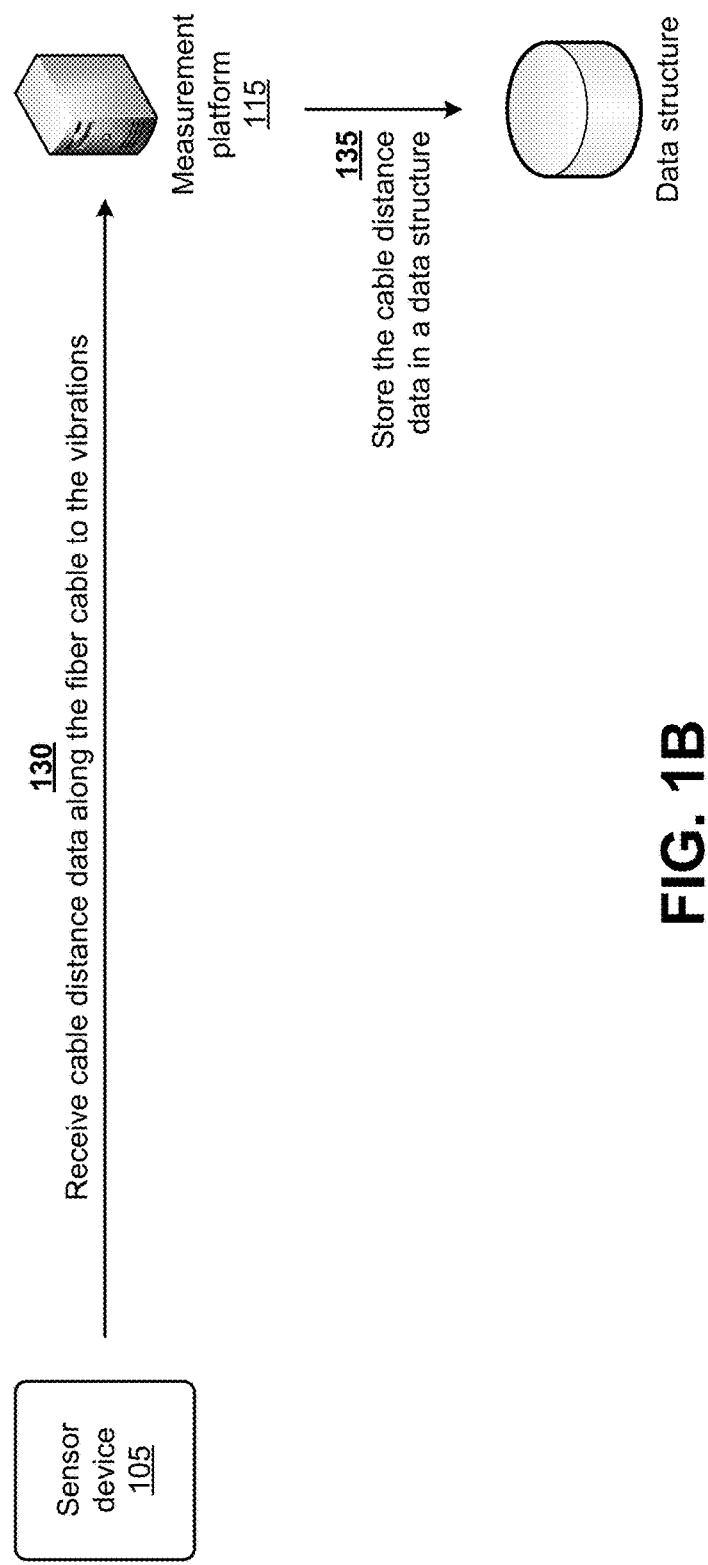

The following detailed description of example implementations refers to the accompanying drawings. The same reference numbers in different drawings may identify the same or similar elements.

Current techniques do not accurately identify locations of a deployed fiber cable. Thus, when a fault occurs in the fiber cable, a field technician may not quickly identify a location of the fault and may not quickly travel to the location and correct the fault in the fiber cable. Current techniques fail to identify locations of deployed fiber cable for several reasons. For example, to identify a location of a fault in a fiber cable, a technician may utilize an optical time-domain reflectometer (OTDR) to measure cable distance from a central office to the location of the fault. However, the cable distance measured by the OTDR fails to provide a geographical location between the central office and the location of the fault. Moreover, the distance measured by the OTDR cannot be accurately correlated to a geographic location, because each deployed fiber cable may include uncertain amounts of localized path deviations or spare cable looping (e.g., slack) along deployed routes. A difference between a geographic location derived from the OTDR-measured cable distance based on a route layout and the actual geographical location may be very large. Therefore, a lot of guesswork may be involved in identifying a particular location of a fault in a fiber cable, which results in wasted time in finding the right location to inspect/repair, as well as potential additional cost in destruction/reconstruction of areas around the fiber cable simply to identify the correct location of the fault. Thus, current techniques for identifying locations of deployed fiber cable waste computing resources (e.g., processing resources, memory resources, communication resources, and/or the like), networking resources, transportation resources, human resources, and/or the like associated with identifying an incorrect location of a fault in a fiber cable, traveling to the incorrect location, accessing the fiber cable underground at the incorrect location, re-identifying a correct location of the fault in the fiber cable, recovering lost network traffic, and/or the like.

Some implementations described herein provide a measurement platform for identifying locations of a deployed fiber cable based on vibrations. For example, the measurement platform may receive, from a sensor device, cable distance data identifying one or more cable distances along the fiber cable to one or more vibrations experienced by the fiber cable, where the one or more vibrations may be generated by a vibration device along a deployed route of the fiber cable. The measurement platform may also receive location data identifying the location of the vibration device, and may correlate the cable distance data and the location data to generate correlated location data for the fiber cable. The measurement platform may store the correlated location data in a data structure associated with the measurement platform. In the event of an alarm condition (e.g., a fault) associated with the fiber cable, a sensor device may determine a cable distance to the alarm condition, and the measurement platform may receive data identifying the cable distance to the alarm condition. The measurement platform may determine a location of the alarm condition based on the correlated location data and using the data identifying the cable distance along the fiber cable to the alarm condition. The measurement platform may also perform one or more actions based on the location of the alarm condition.

In this way, the measurement platform may quickly identify a location of a fault in a fiber cable so that an action may be taken to avoid the fault and/or service the fault in the fiber cable. Thus, the measurement platform conserves computing resources, networking resources, transportation resources, human resources, and/or the like that would otherwise have been wasted in identifying an incorrect location of a fault in a fiber cable, traveling to the incorrect location, re-identifying a correct location of the fault in the fiber cable, recovering lost network traffic, and/or the like.

FIGS. 1A-1G are diagrams of one or more example implementations 100 described herein. As shown in FIG. 1A, a sensor device 105 may be associated with a vibration device 110 and a measurement platform 115. A fiber cable may be associated with sensor device 105. A vibration device 110 may be deployed at locations along a path of the fiber cable.

As further described below, sensor device 105 may include optical devices, such as a distributed optical fiber sensing device (e.g., a Rayleigh scattering based distributed optical fiber acoustic sensing device), an optical reflectometry device (e.g., an optical time-domain reflectometry (OTDR) device), a computer, and/or the like that may sense vibrations in fiber cables caused by vibration device 110. As further described below, vibration device 110 may include a mechanical vibration exciter, an electrodynamic vibration exciter, electrohydraulic vibration exciter, an electromagnetic vibration exciter, a computer, and/or the like that generates vibrations along the paths of the fiber cable. As further described below, measurement platform 115 may include a platform that identifies locations of a deployed fiber cable based on information received from sensor device 105 and associated with the vibration device 110, as described herein.

As further shown in FIG. 1A, and by reference number 120, vibration device 110 may generate vibrations along deployed paths of a fiber cable. For example, vibration device 110 may generate a vibration at a first location of a deployed path of the fiber cable, and then may move to a second location of the deployed path of the fiber cable. Vibration device 110 may generate a vibration at the second location of the deployed path of the fiber cable, and may then be moved to a third location of the deployed path of the fiber cable. This process may repeat until vibrations are generated by vibration device 110 along all selected locations along the deployed path of the fiber cable. The locations may be selected, for example, depending on accessibility of the fiber cable to vibration device 110, based on minimum/maximum distances between locations, or based on another selection technique.

As further shown in FIG. 1A, and by reference number 125, sensor device 105 may detect the vibrations generated along the deployed paths of the fiber cable, and may determine distances along the fiber cable to the vibrations. For example, sensor device 105 may provide a first optical signal (e.g., light) to the fiber cable while a first vibration event is occurring, and the first optical signal may be (at least partially) reflected back to sensor device 105 from a first location of a deployed path of the fiber cable where the first vibration is applied. Sensor device 105 may detect (using the distributed optical sensing device), the first optical signal reflected back from the first location to sensor device 105 and may determine a first cable distance from the first location to a location of sensor device 105 (for example, based on the speed of light through the fiber cable and based on the first optical signal reflected back from the first location to sensor device 105). Sensor device 105 may provide a second optical signal to the fiber cable while a second vibration event is occurring, and the second optical signal may be reflected back to sensor device 105 from a second location of the deployed path of the fiber cable where the second vibration is applied. Sensor device 105 may detect the second optical signal reflected back from the second location to sensor device 105, and may determine a second cable distance from the second location to the location of sensor device 105. This process may repeat until cable distances are determined by sensor device 105 for one or more locations along the deployed path of the fiber cable where vibrations are applied.

The vibration and measurement process may be performed while communications traffic is being carried by the fiber optic cable, as the vibrations experienced by the fiber cable do not prevent the transmission of optical signals between the endpoints of the fiber cable. Moreover, no modifications need to be made to the surroundings of the fiber cable (e.g., excavation, unmounting, rehanging) or the cable itself (e.g., cutting, splicing) in order to obtain the reflected optical signals used for the cable distance measurement, as the vibrations experienced by the cable create the conditions for optical reflection (e.g., back scattering) that may be used by the distributed optical fiber sensing device to measure cable distance. In some implementations, the optical signals used to perform cable measurements may use wavelengths that are outside those used for carrying communications traffic. Thus, the fiber cable location processes and systems described herein effectively obtain fiber location data without impacting the operation of the fiber cable or the environment around the fiber cable.

As shown in FIG. 1B, and by reference number 130, measurement platform 115 may receive, for example, from sensor device 105, cable distance data identifying corresponding distances along the fiber cable to the vibrations. In some embodiments, the cable distance data may also include measurement identifiers (IDs) that identify, for example, a number of the measurement made on the fiber cable, and the data identifying corresponding cable distances from the location of sensor device 105 to the vibration location may be associated with the measurement number. For example, as shown in FIG. 1B, the cable distance data may be represented as a table with a measurement ID field that includes entries for measurement IDs (measurement 1, 2, 3, . . . , N) and a vibration distance field that includes entries for corresponding cable distances along the fiber cable from sensor device 105 to each detected vibration (e.g., 1,345 meters, 4,745 meters, 15,700 meters, and/or the like).

As further shown in FIG. 1B, and by reference number 135, measurement platform 115 may store the cable distance data in a data structure (e.g., a database, a table, a list, and/or the like) associated with measurement platform 115. In some implementations, the cable distance data is collected once by sensor device 105, provided to measurement platform 115, and stored in the data structure. Alternatively, if the deployed route of the fiber cable is updated, sensor device 105 and vibration device 110 may repeat the process described above in order to collect updated cable distance data for the fiber cable. Sensor device 105 may provide the updated cable distance data to measurement platform 115, and measurement platform 115 may replace the cable distance data for the fiber cable with the updated cable distance data for the fiber cable.

Figure 1C:
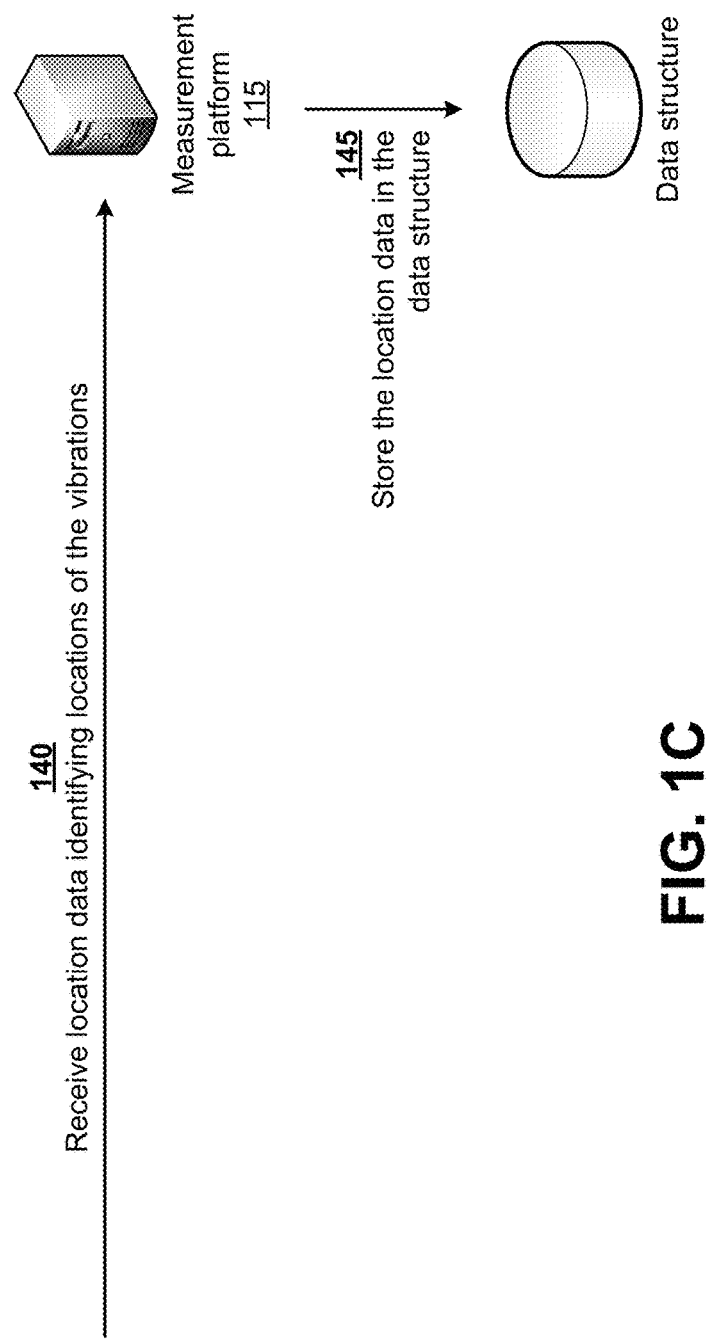

As shown in FIG. 1C, and by reference number 140, measurement platform 115 may receive location data identifying locations of the vibrations (e.g., locations where a vibration event occurred). In some implementations, the locations of the vibrations are provided contemporaneously with the measurements of cable distance data by sensor device 105. In some implementations, the locations of the vibrations are provided at some time after the measurements of cable distance data by sensor device 105 have been obtained (e.g., after all the vibration locations have been measured).

In some implementations, the location data may include measurement identifiers (IDs) that identify a measurement number of a measurement taken during a vibration event at a vibration location, and the data identifying locations of the vibrations during the measurements may be associated with the measurement numbers. For example, as shown in FIG. 1C, the location data may be represented as a table with a measurement ID field that includes entries for measurement IDs of the measurements taken (e.g., measurements 1, 2, 3, . . . , N) and a location field that includes entries for a corresponding geographical location associated with the location of each of the vibration events during the measurements (e.g., "345 Main Street," "Vault 17," "Pole 34-536," and/or the like).

As further shown in FIG. 1C, and by reference number 145, measurement platform 115 may store the location data in the data structure associated with measurement platform 115. In some implementations, the location data is provided once to measurement platform 115, and stored in the data structure. Alternatively, if the deployed route of the fiber cable is updated, sensor device 105 and vibration device 110 may repeat the process described above in order to collect updated location data for the fiber cable. Updated location data may be provided to measurement platform 115, and measurement platform 115 may replace the location data for the fiber cable with the updated location data for the fiber cable.

Figure 1D:
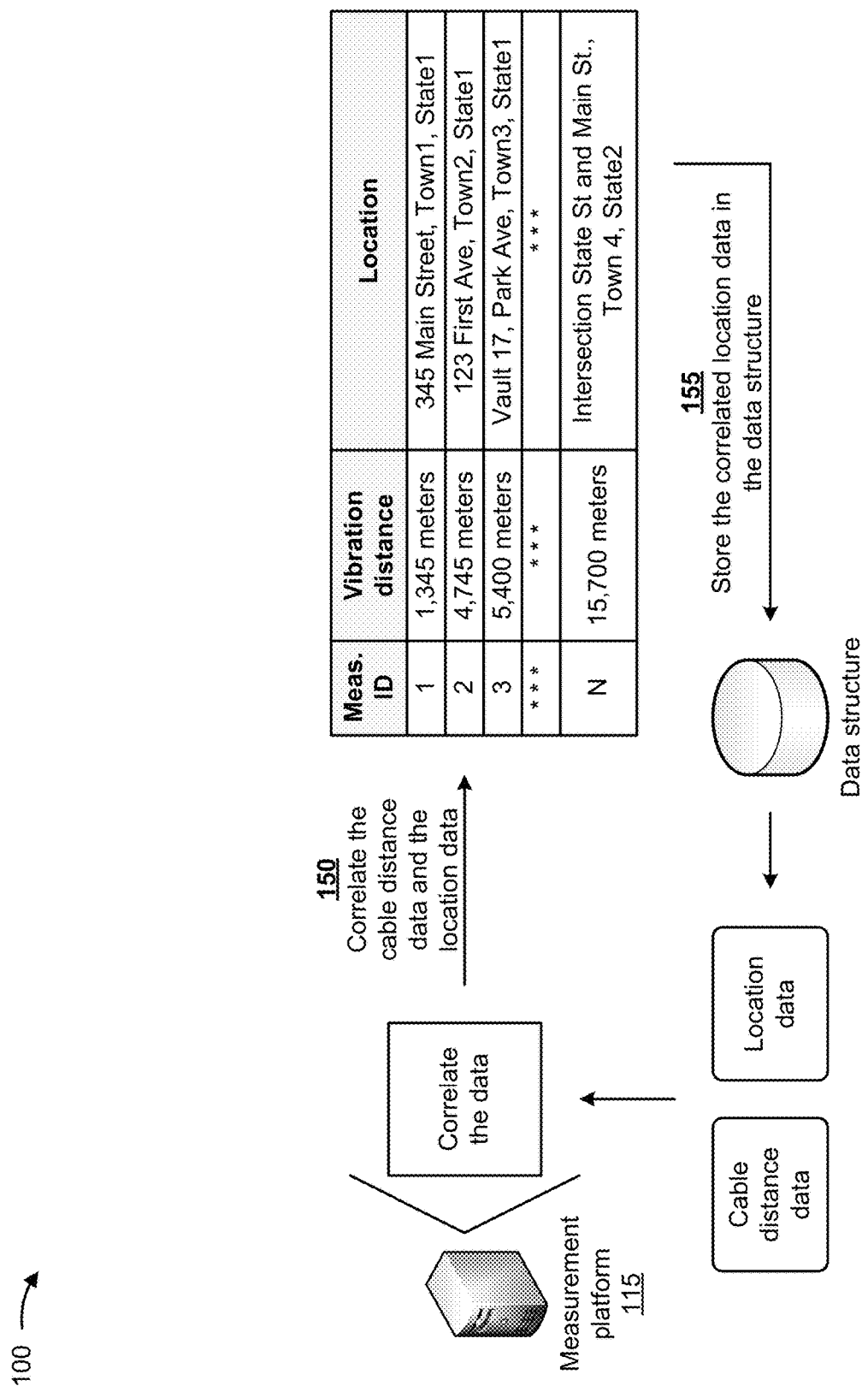

As shown in FIG. 1D, and by reference number 150, measurement platform 115 may correlate the cable distance data and the location data to generate correlated location data. For example, measurement platform 115 may create a data structure that merges the vibration distance field of the cable distance data with the location field of the location data, using the measurement ID to do the correlation. The created data structure may correspond to the correlated location data. As shown, the correlated location data may be represented as a table with a vibration distance field that includes entries for corresponding cable distances along the fiber cable to vibrations (e.g., 1,345 meters, 4,745 meters, 15,700 meters, and/or the like) and a location field that includes entries for corresponding geographical locations associated with the vibrations of the fiber cable (e.g., "345 Main Street," "Vault 17," "Pole 34-536," and/or the like). In some implementations, a measurement ID field may also be included in the correlated location data, indicating the measurement identifier associated with the cable distance and location.

As further shown in FIG. 1D, and by reference number 155, measurement platform 115 may store the correlated location data in the data structure associated with measurement platform 115. In some implementations, the correlated location data is determined once by measurement platform 115, and stored in the data structure. Alternatively, if the deployed route of the fiber cable is updated, sensor device 105 and vibration device 110 may repeat the process described above in order to collect updated cable distance data and updated location data for the fiber cable. Sensor device 105 may provide the updated cable distance data to measurement platform 115, and updated location data associated with the deployment and activation of vibration device 110 to measurement platform 115. Measurement platform 115 may determine updated correlated location data for the fiber cable based on the updated cable distance data and the updated location data. Measurement platform 115 may replace the correlated location data for the fiber cable with the updated correlated location data for the fiber cable.

Figure 1E:
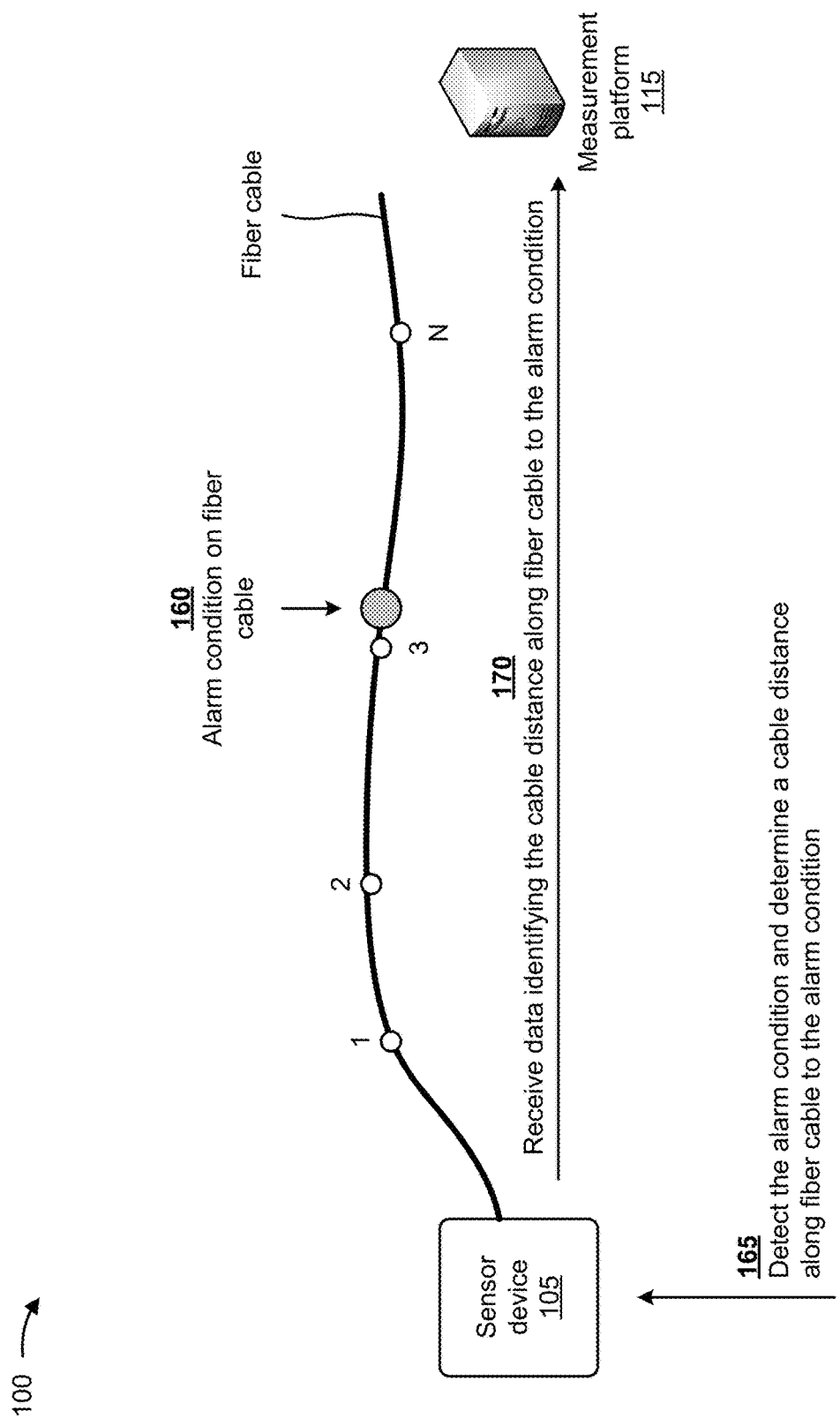

As shown in FIG. 1E, and by reference number 160, an alarm condition may occur in the fiber cable. The alarm condition may be a result of a fiber cut, a high loss splice point, a tightly bending point, and/or the like associated with the fiber cable. For purposes of this example, if different cable distances along the fiber cable are labeled "1" through "N," the alarm condition may occur at a cable distance (e.g., from sensor device 105) nearby a location labeled "3." The alarm condition may be detected by a network device (e.g., a network provider server) that manages a network associated with the fiber cable.

As further shown in FIG. 1E, and by reference number 165, as a result of the alarm condition, sensor device 105 may be activated to determine a cable distance along the fiber cable to the cause of the alarm condition. For example, sensor device 105 may provide an optical signal to the fiber cable, and the cause of the alarm condition (e.g., a displacement or a fiber cut) associated with the fiber cable may cause the optical signal to be reflected back to sensor device 105 from a location of the alarm condition. Sensor device 105 may detect the optical signal reflected back from the location of the alarm condition to sensor device 105, and may determine a cable distance from the location of the alarm condition to a location of sensor device 105. In this example, assume the measurement is determined to be 5,500 meters.

As further shown in FIG. 1E, and by reference number 170, measurement platform 115 may receive, from sensor device 105, data identifying the cable distance along the fiber cable to the alarm condition. For example, measurement platform 115 may receive data identifying the detected cable distance from the location of sensor device 105 to the cause of the alarm condition associated with the fiber cable. In this example, the measurement of 5,500 meters would be provided to the measurement platform.

Figure 1F:
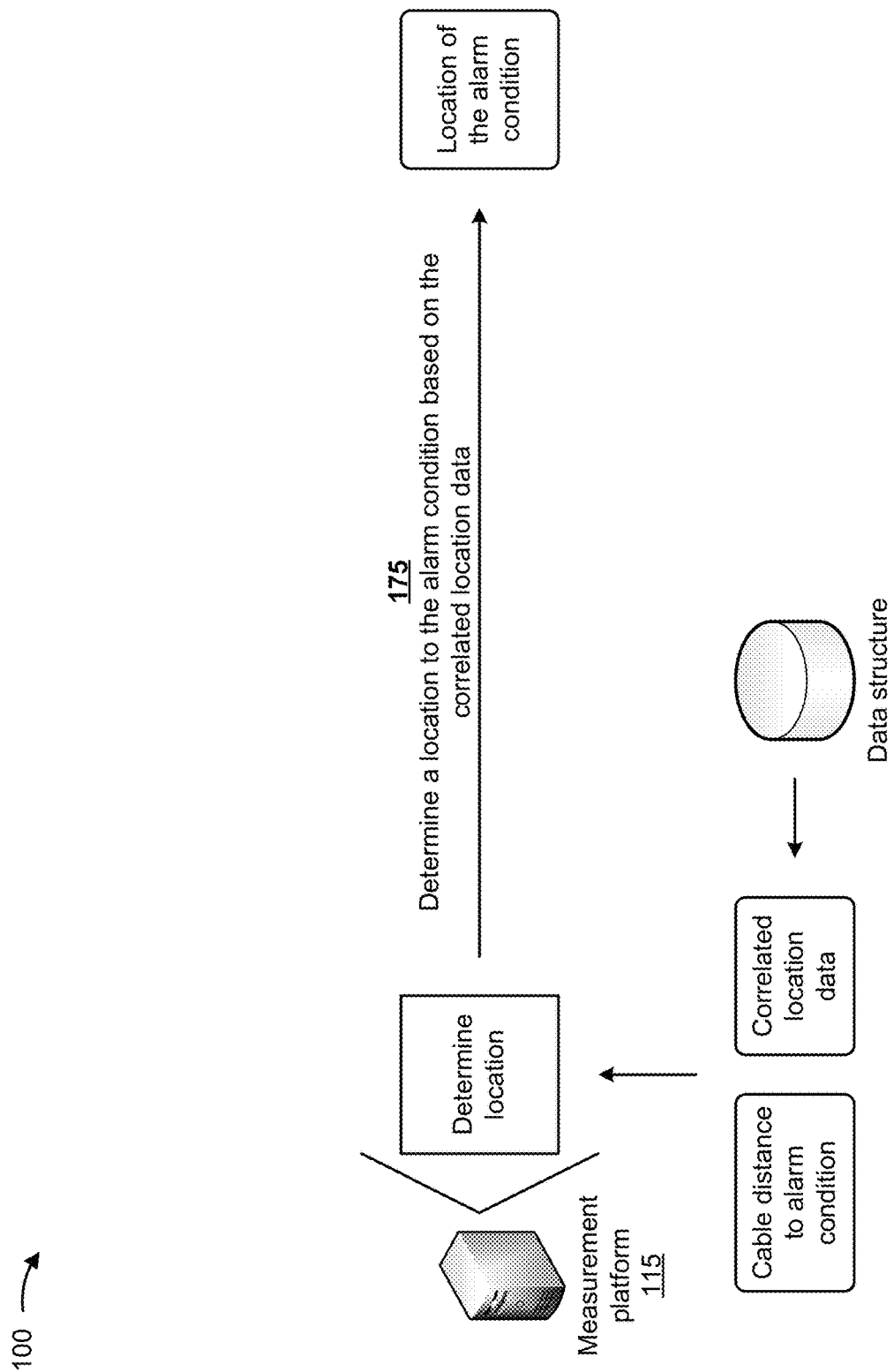

As shown in FIG. 1F, and by reference number 175, measurement platform 115 may determine a location of the alarm condition based on the correlated location data and the data identifying the cable distance along the fiber cable to the alarm condition. Continuing with the current example, where the cable distance along the fiber cable to the alarm condition is determined to be 5,500 meters, measurement platform 115 may use the information of the correlated location data to determine a geographic location closest to the alarm condition—in this case, "Vault 17, Park Ave., Town3, State1." In some implementations, measurement platform 115 may also provide a cable distance from the location determined from the correlated location data from which the actual measurement can most likely be found. Continuing the current example, measurement platform 115 may provide not only the geographic location of "Vault 17, Park Ave., Town3, State1," but also "+100 meters" to indicate that the alarm condition is likely located 100 meters beyond the geographic location.

Figure 1G:
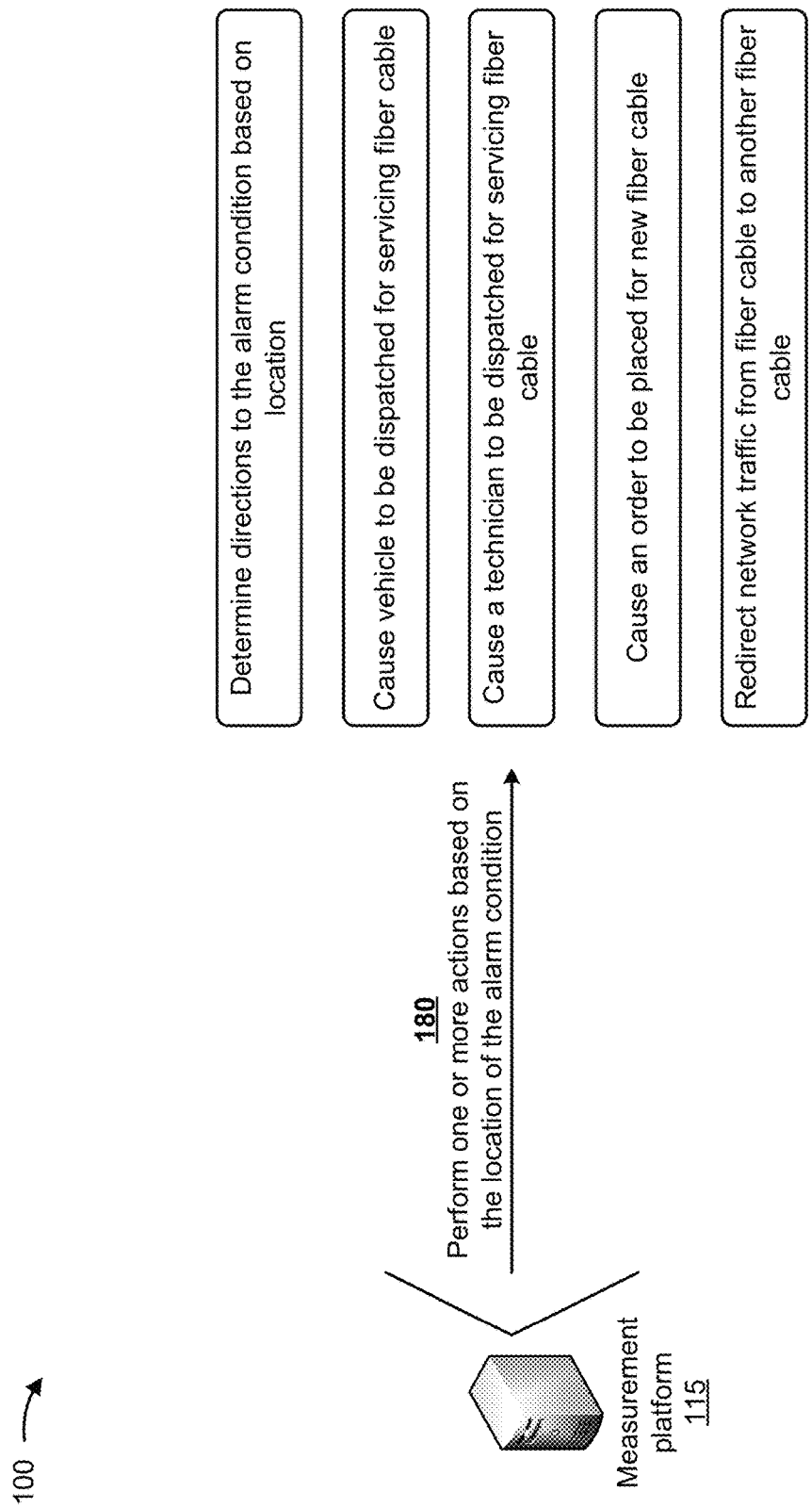

As shown in FIG. 1G, and by reference number 180, based on the determined geographic location of the cause of the alarm condition, measurement platform 115 may perform one or more actions. In some implementations, the one or more actions include measurement platform 115 determining directions (e.g., a navigation route) to the cause of the alarm condition based on the location of the alarm condition. For example, if measurement platform 115 determines that the alarm condition is located at "Vault 17, Park Ave., Town3, State1," measurement platform 115 may calculate directions to the alarm condition, for example, from the fiber cable origination point, a nearby service center, or other starting point. In this way, measurement platform 115 may quickly provide directions to a technician and/or a vehicle for repairing the fiber cable, which conserves resources that would otherwise have been wasted in manually determining directions to the technician and/or the vehicle, causing the technician and/or the vehicle to travel based on potentially incorrect directions, and/or the like.

In some implementations, the one or more actions include measurement platform 115 causing a vehicle to be dispatched for servicing the fiber cable. For example, measurement platform 115 may cause an autonomous automobile (e.g., a car, a truck, a van, and/or the like) to be dispatched for servicing the fiber cable. In this way, measurement platform 115 may utilize existing land routes and infrastructure to service the fiber cable, thereby conserving resources (e.g., computing resources, networking resources, and/or the like) that would otherwise have been wasted in scheduling a repair service, assigning a technician for the repair service, and/or the like.

In some implementations, the one or more actions include measurement platform 115 causing an airborne autonomous vehicle to be dispatched for servicing the fiber cable. For example, measurement platform 115 may cause an unmanned aerial vehicle to be dispatched for servicing the fiber cable. In this way, measurement platform 115 may service the fiber cable at locations that may be restricted by automobile traffic, traffic controls, inaccessible roadways, unnavigable terrain, and/or the like, thereby conserving resources that would otherwise have been wasted servicing the fiber cable at the locations in a more expensive or more time-consuming manner (e.g., with larger and/or heavier vehicles, slower vehicles, less direct routes, and/or the like).

In some implementations, the one or more actions include measurement platform 115 causing a technician to be dispatched for servicing the fiber cable. For example, measurement platform 115 may automatically identify an available technician nearest to the alarm condition and may instruct the technician to travel to the alarm condition and service the fiber cable. In this way, measurement platform 115 may enable servicing of the fiber cable, thereby conserving resources (e.g., computing resources, networking resources, and/or the like) that would otherwise have been wasted in scheduling a repair service, assigning a technician for the repair service, and/or the like.

In some implementations, the one or more actions include measurement platform 115 causing an order for new fiber cable to be placed for repairing the fiber cable. For example, measurement platform 115 may automatically invoke a provider of fiber cable to deliver the new fiber cable to the location of the alarm condition. In some implementations, measurement platform 115 may cause the new fiber cable to be autonomously delivered to the location of the alarm condition. In this way, measurement platform 115 may automatically cause the new fiber cable to be provided at the location that requires the new fiber cable for repairing the fiber cable.

In some implementations, the one or more actions include measurement platform 115 redirecting network traffic from the fiber cable to another fiber cable. For example, measurement platform 115 may identify network traffic associated with the fiber cable, and may identify another fiber cable that is available and can handle the network traffic. Measurement platform 115 may then redirect the network traffic to the other fiber cable. In this way, measurement platform 115 may temporarily utilize the other fiber cable for the network traffic, thereby conserving resources that would otherwise have been wasted in identifying lost network traffic, attempting to recover the lost network traffic, and/or the like.

The one or more actions may include the measurement platform 115 providing the location of the alarm condition to a requesting system or as part of an alerting message or other transmission. The location of the alarm condition may, in some implementations, include the geographic location and an additional distance from the geographic location.

In this way, several different stages of the process for identifying locations of deployed fiber cables are automated and performed without disruption to physical environment or network operations, which may remove waste from the process, and improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that accurately identifies locations of deployed fiber cables in the manner described herein. Finally, the process for identifying locations of deployed fiber cables conserves computing resources, networking resources, transportation resources, human resources, and/or the like that would otherwise have been wasted in identifying an incorrect location of a fault in a fiber cable, traveling to the incorrect location, re-identifying a correct location of the fault in the fiber cable, recovering lost network traffic, and/or the like.

As indicated above, FIGS. 1A-1G are provided merely as examples. Other examples may differ from what was described with regard to FIGS. 1A-1G. The number and arrangement of devices and networks shown in FIGS. 1A-1G are provided as an example. In practice, there may be additional devices and/or networks, fewer devices and/or networks, different devices and/or networks, or differently arranged devices and/or networks than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) of FIGS. 1A-1G may perform one or more functions described as being performed by another set of devices of FIGS. 1A-1G.

Figure 2:
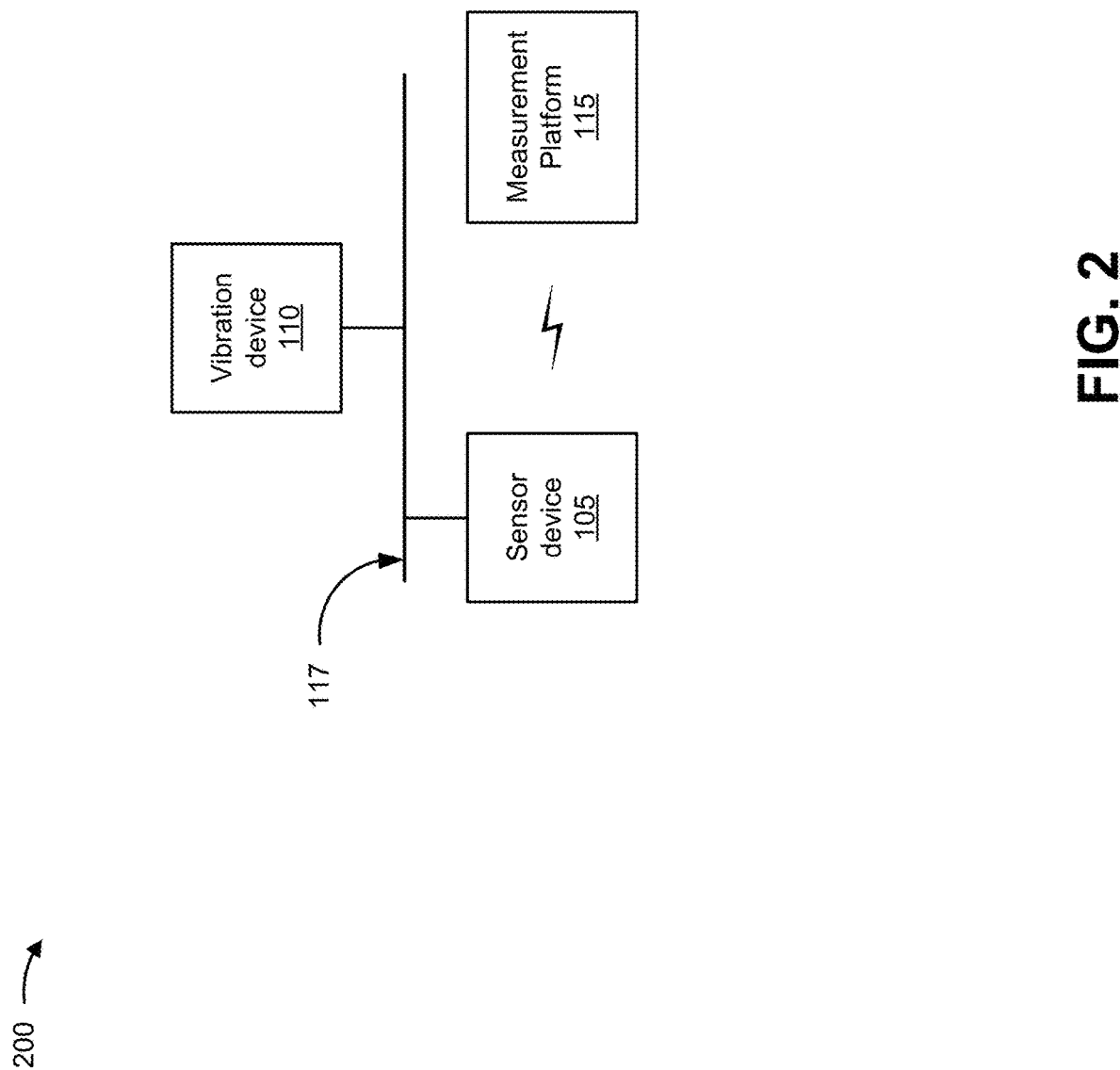
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include sensor device 105, vibration device 110, measurement platform 115 and fiber cable 117. Sensor device 105 may include one or more devices capable of receiving, generating, storing, processing, and/or providing information, such as information described herein. For example, as noted above, sensor device 105 may include optical components, including a distributed optical fiber sensing device—such as a distributed optical fiber acoustic sensing device that uses a fiber cable to provide distributed strain sensing, where the fiber cable is a sensing element and vibration measurements are made using an optoelectronic device. The distributed optical fiber sensing device may include a Rayleigh scattering-based distributed optical fiber acoustic sensing device. Sensor device 105 may further include an optical reflectometry device, such as an optical time-domain reflectometry (OTDR) device. The optical reflectometry device may be used with the distributed optical sensing device to perform acoustical sensing of vibrations applied to and experienced by a fiber optic cable. Sensor device 105 may also include or be associated with a processing system, such as a laptop computer, a tablet computer, a desktop computer, a handheld computer, or a similar type of device, that determines vibration measurements and fiber cable distances to detected vibrations. In some implementations, sensor device 105 may receive information from and/or transmit information to measurement platform 115 through a communication channel between them.

Vibration device 110 may include a vibration exciter that produces a mechanical motion to vibrate a test object (e.g., a fiber cable, such as fiber cable 117), and that produces a range of harmonic or time-dependent excitation forces and/or displacements through a range of frequencies. Vibration device may be controllable to vary the frequency, intensity, or other characteristics of the vibrations created. Vibration device 110 may include a mechanical vibration exciter, an electrodynamic vibration exciter, electrohydraulic vibration exciter, an electromagnetic vibration exciter, and/or the like. Vibration device 110 may generate vibrations along paths of fiber cables. Vibration device 110 may also include or be associated with a laptop computer, a tablet computer, a desktop computer, a handheld computer, or a similar type of device that determines locations associated with the generated vibrations along the paths of the fiber cables.

Measurement platform 115 includes one or more devices that identify locations of deployed fiber cables based on vibrations. For example, measurement platform 115 may include a server device, a laptop computer, a tablet computer, a desktop computer, a group of server devices, or a similar type of device. In some implementations, measurement platform 115 may receive information from and/or transmit information to one or more sensor devices 105 using a communication channel between them.

Fiber cable 117 may be a fiber optic cable used to carry optical communications traffic in the form of optical signals. Fiber cable may be deployed in a route from an origin location (e.g. a central office, a point of presence) to a destination location (e.g., a different central office or point of presence). The fiber cable 117 may be deployed underground or above ground (e.g., using poles or other vertical stanchions). Fiber cable 117 may have various small deviations from its deployment route (e.g., to avoid obstacles or comply with property rights), and may include sections that are spooled into "slack" to enable future repairs or improvements.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
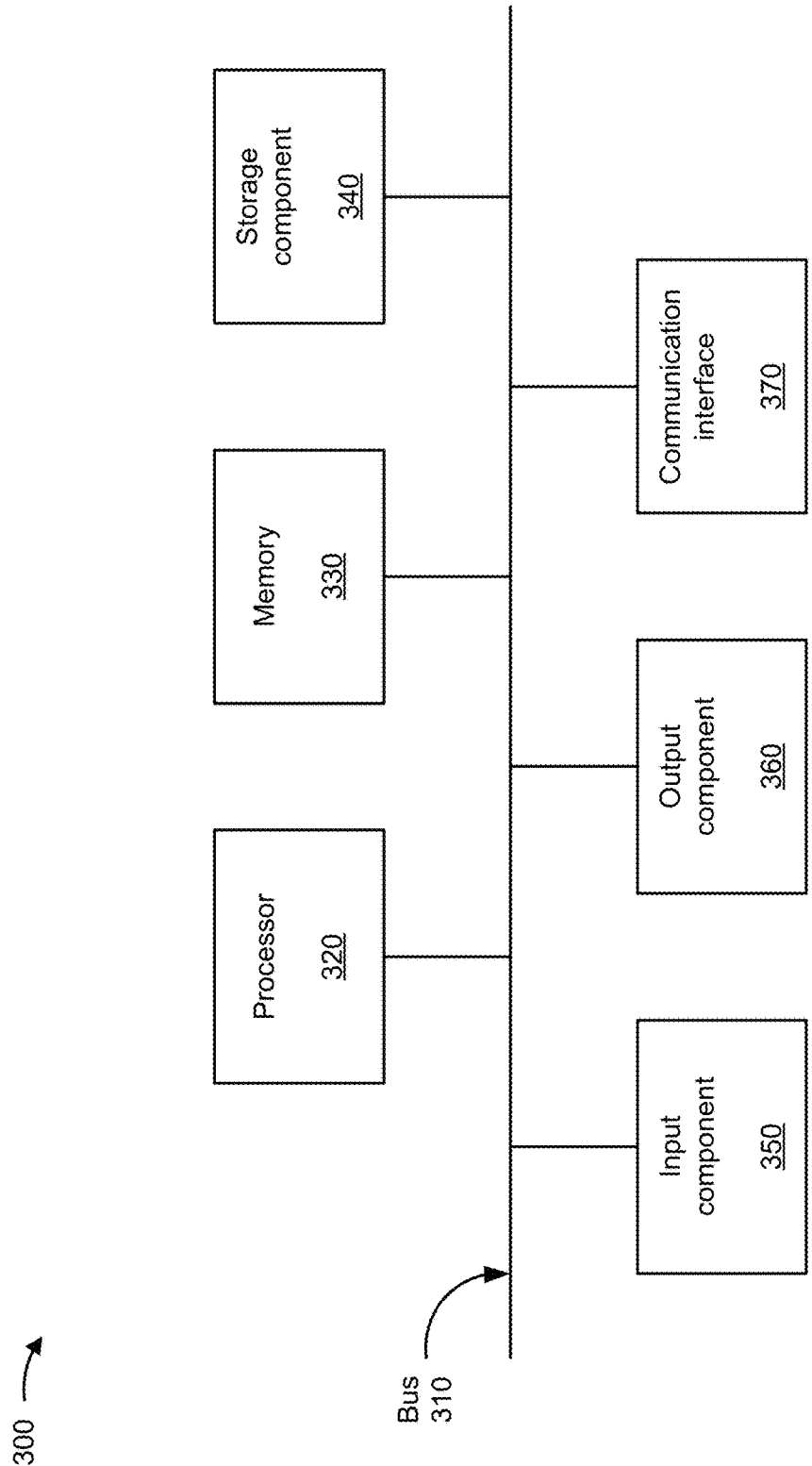
FIG. 3 is a diagram of example components of one or more devices.

FIG. 3 is a diagram of example components of a device 300. Device 300 may correspond to or be included as part of sensor device 105 and/or measurement platform 115. In some implementations, sensor device 105 and/or measurement platform 115 include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for identifying locations of deployed fiber cables based on vibrations. In some implementations, one or more process blocks of FIG. 4 may be performed by a device (e.g., measurement platform 115). In some implementations, one or more process blocks of FIG. 4 may be performed by another device or a group of devices separate from or including the device, such as a sensor device (e.g., sensor device 105).

As shown in FIG. 4, process 400 may include receiving, from a sensor device, cable distance data for one or more cable distances along the fiber cable to vibrations experienced by the fiber cable (block 410). For example, the device (e.g., using processor 320, communication interface 370, and/or the like) may receive, from a sensor device, cable distance data identifying a cable distance along the fiber cable to one or more vibrations experienced by the fiber cable, as described above. In some implementations, the vibrations are generated by a vibration device located along a deployed route of the fiber cable. The sensor device may include optical devices such as a distributed optical fiber sensing device and optical reflectometry device that communicate with the fiber cable and detect the vibrations experienced by the fiber cable. The vibration device may include a vibration exciter that produces a mechanical motion that produces a range of harmonic or time-dependent excitation forces or displacements through a range of frequencies.

As further shown in FIG. 4, process 400 may include receiving location data identifying a geographic location of locations associated with the vibrations (block 420). For example, the device (e.g., using processor 320, memory 330, communication interface 370, and/or the like) may receive location data identifying location data for the locations associated with the vibration events, as described above.

As further shown in FIG. 4, process 400 may include correlating the cable distance data and the location data to generate correlated location data (block 430). For example, the device (e.g., using processor 320, storage component 340, and/or the like) may correlate the cable distance data and the location data to generate correlated location data, as described above. In some implementations, correlating the cable distance data and the location data to generate the correlated location data includes correlating data identifying the cable distances to the geographic locations associated with the vibrations, for example using the measurement identifiers.

As further shown in FIG. 4, process 400 may include storing the correlated location data in a data structure associated with the device (block 440). For example, the device (e.g., using processor 320, memory 330, storage component 340, and/or the like) may store the correlated location data in a data structure associated with the device, as described above.

As further shown in FIG. 4, process 400 may include receiving, from the sensor device, data identifying a cable distance along the fiber cable to an alarm condition associated with the fiber cable (block 450). For example, the device (e.g., using processor 320, communication interface 370, and/or the like) may receive, from the sensor device, data identifying a cable distance along the fiber cable to an alarm condition associated with the fiber cable, as described above. The alarm condition may be associated with, for example, a fiber cut in the fiber cable or other fault in the fiber cable.

As further shown in FIG. 4, process 400 may include determining a location of the alarm condition based on the correlated location data (block 460). For example, the device (e.g., using processor 320, memory 330, and/or the like) may determine a location of the alarm condition based on the correlated location data. The data identifying the cable distance along the fiber cable to the alarm condition may be used to determine a closest geographic location from the correlated location data, as described above. The geographic location may be provided, and in some implementations may include a likely distance from the geographic location.

As further shown in FIG. 4, process 400 may include performing one or more actions based on the location of the alarm condition (block 470). For example, the device (e.g., using processor 320, memory 330, storage component 340, communication interface 370, and/or the like) may perform one or more actions based on the location of the alarm condition, as described above. In some implementations, performing the one or more actions includes determining directions to the alarm condition based on the location of the alarm condition; causing a ground autonomous vehicle to be dispatched for servicing the fiber cable; causing an airborne autonomous vehicle to be dispatched for servicing the fiber cable; causing a technician to be dispatched for servicing the fiber cable; causing an order for new fiber cable to be placed for repairing the fiber cable; or redirecting network traffic from the fiber cable to another fiber cable.

In some implementations, performing the one or more actions includes identifying another fiber cable that is operational and capable of receiving network traffic from the fiber cable, and redirecting the network traffic from the fiber cable to the other fiber cable. In some implementations, performing the one or more actions includes determining directions to the alarm condition based on the location of the alarm condition, and providing the directions to an autonomous vehicle to enable the autonomous vehicle to be dispatched for servicing the fiber cable.

Process 400 may include additional implementations, such as any single implementation or any combination of implementations described below and/or in connection with one or more other processes described elsewhere herein.

In some implementations, process 400 includes storing the cable distance data and the location data in the data structure associated with the device.

In some implementations, process 400 includes receiving, from the sensor device, updated cable distance data along the fiber cable to one or more new vibration locations of the fiber cable; receiving updated location data identifying locations associated with the one or more new vibrations; correlating the updated cable distance data and the updated location data to generate updated correlated location data; and replacing the correlated location data with the updated correlated location data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5H, 6, 7 and 8A-8C illustrate more example implementations of a fiber cable location system. In practice, a network provider may manage a network that includes many fiber cables deployed over a large geographic area. Each fiber cable may extend many kilometers between endpoints, sometimes through geographies that are not fully mapped (e.g. rural areas), and where endpoints may be geographically separated by large distances. In order to manage such a network, and in particular quickly respond to faults that may occur due to fiber cable disruptions, it is desirable to have the ability to locate fiber cable geographic locations with enhanced accuracy. For example, locating a fault to within a 500 meter section of cable may still require extensive excavation (for subterranean cables) to find a fault. Furthermore, it may not be feasible to perform vibrational mapping in an extensive network on a fiber-by-fiber basis using sensor device/vibration device pairs.

Implementations described herein and with reference to FIGS. 5A-5H, 6, 7 and 8A-8C provide systems and methods for identifying locations of deployed fiber cables based on vibrations, using sensor devices, vibration platforms and a measurement platform that may intercommunicate via networking facilities, and obtain highly accurate location measurements. The sensor devices may include capabilities to perform vibration sensing by request and/or continuously over a time period, and report cable distance data to a measurement platform over an available network. Vibration platforms may include vibration devices to cause vibrations in fiber cables, as well as geographic location facilities to determine precise geographic coordinates associated with the vibrations. The vibration platforms may include capabilities to perform vibration events by request, over a designated route, autonomously over a time period, and to report geographic coordinates associated with vibration events to the measurement platform over an available network. A measurement platform may be implemented to receive cable distance data from sensor devices and vibration geographic coordinates from vibration platforms, and perform correlation to create correlated data representing cable distance/geographic coordinate pairs. The correlation may be through synchronous processing (e.g., intercommunication among sensor devices, vibration platforms and measurement platform) and/or through asynchronous processes coordinated through timestamps, cable identification, device identification, and/or the like. The measurement platform may implement one or more interfaces that provide access over available networks, one or more user interfaces that permit visualization and notification, and automated monitoring and response features to detect, log and or remediate alarms.

In this way, the fiber location system and process identifies locations of deployed fiber cables based on vibrations in an efficient and accurate manner. Using geographic coordinates (such as latitude and longitude, plus codes, or other geocoding) allows for more accurate specification of geographic location, particularly in areas not fully mapped or under mapped in common postal mapping systems (e.g., rural areas, non-street right of ways, etc.), and provides for uniform storage and retrieval of location information. Using automated vibration sensing systems and methods permits a higher density of measurements to be made over the path of a fiber cable, allows for multiple vibration sensing systems and methods to be performed concurrently, and/or allows for more efficient vibration sensing where multiple fiber cables are involved, as described further below. The measurement platform may quickly identify geographic coordinates of a fault in a fiber cable and provide geographic coordinates for reporting and remediation in ways that may more efficiently resolve network alarms.

Figure 5A:
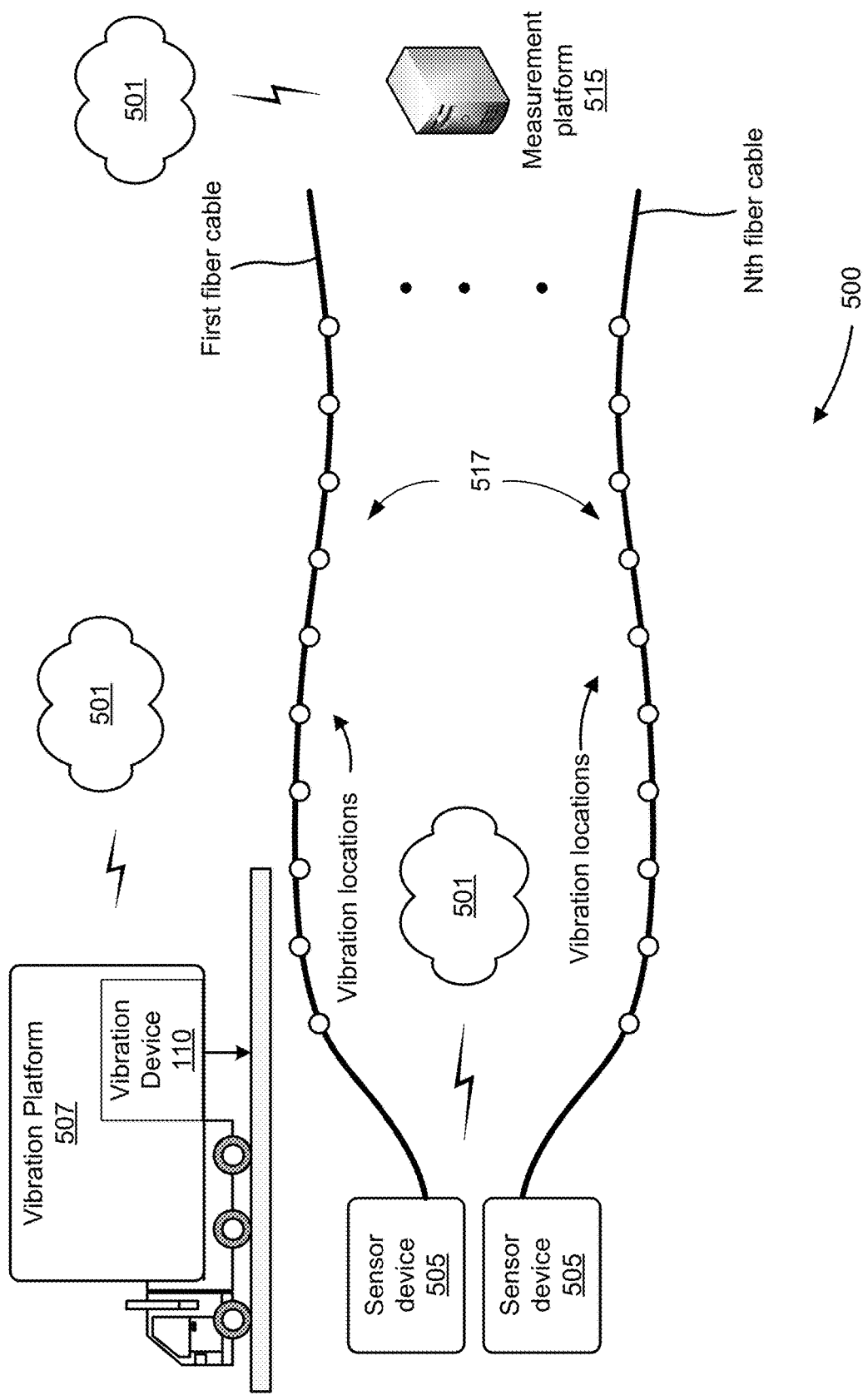

FIG. 5A provides an illustration of an example environment 500 in which the systems and methods describes herein may be used. As shown in FIG. 5A, one or more sensor devices 505 may be deployed to interact with one or more fiber cables 517 (e.g., a first fiber cable, a second fiber cable, . . . , and a Nth fiber cable). One or more vibration platforms 507 may deployed to provide vibration along the path of the fiber cables. A measurement platform 515 may be deployed to provide a fiber cable location facility, as described herein. Sensor devices 505, vibration platforms 507 and measurement platform 515 are communicatively connected via a network 501, such that each may transmit/receive information in network-available formats.

Figure 6:
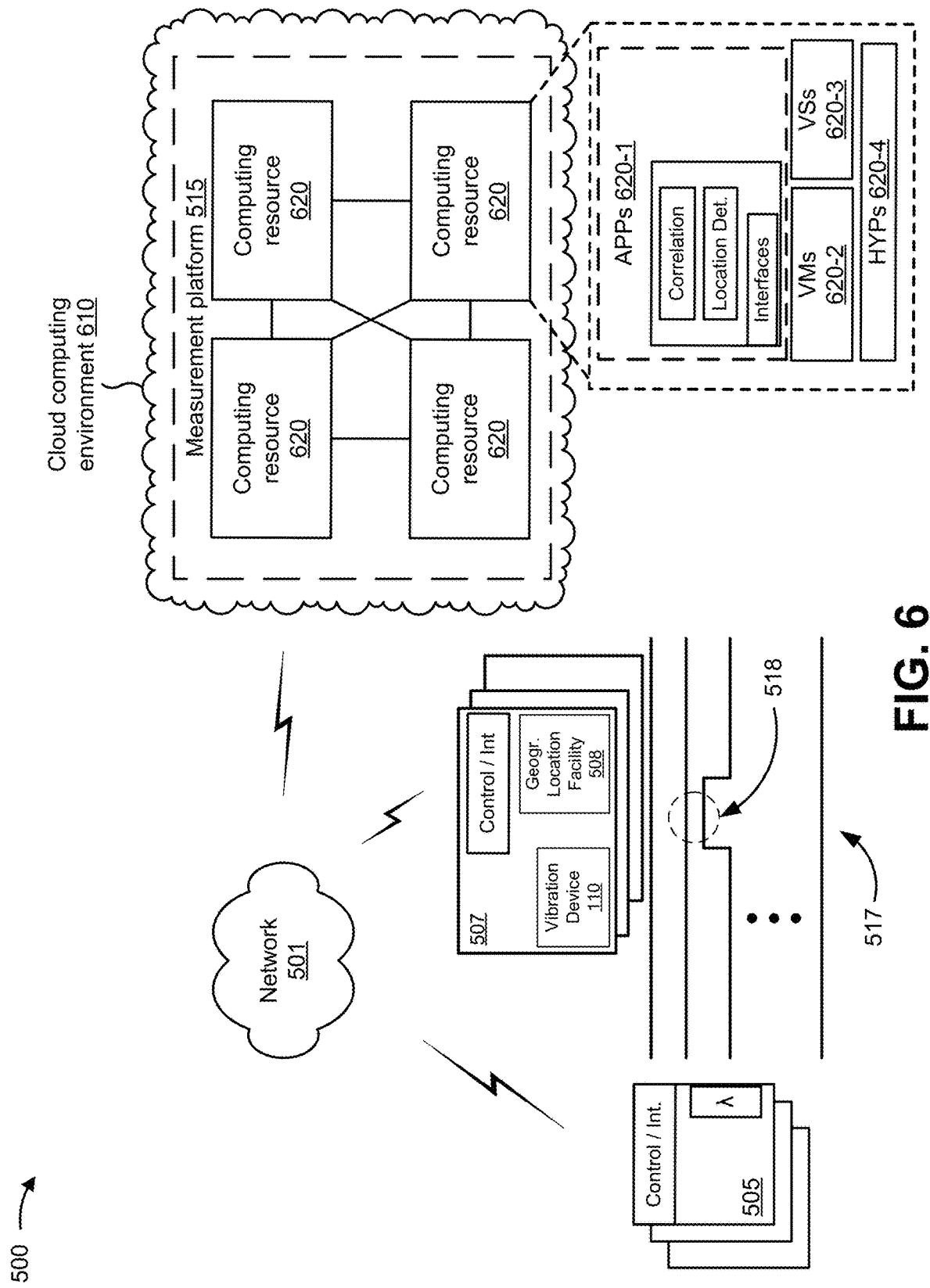
FIG. 6 is a diagram of a second example environment in which systems and/or methods described herein may be implemented.

FIG. 6 further illustrates example environment 500. Sensor devices 505 include one or more devices capable of receiving, generating, storing, processing, and/or providing information, such as information described herein. For example, sensor device 505 may include the capabilities described above with respect to sensor devices 105, for example, optical components (e.g., distributed optical fiber sensing devices, optical reflectometry devices) to make measurements in fiber cables to detect vibration locations and fiber faults. In addition, sensor devices 505 may include control facilities to perform distance measurements by request and/or repeatedly over a period of time, include time stamp information, cable information and/or sensor information associated with distance measurements, as well as network communication interface facilities to send/receive communications over network 501. In some implementations, sensor device 505 may receive information from and/or transmit information to vibration platforms 507 and/or measurement platform 515 (e.g., using network 501).

In some implementations, multiple sensor devices 505 may be used in environment 500—for example, in order to provide sensing capabilities at different origination locations of fiber cables (e.g., central offices, points of presence) and/or to provide sensing to one or more fiber cables at a single location. In some implementations, a single sensor device 505 may be used in connection with multiple fiber cables 517—for example, through the use of an optical interfacing mechanism, such as an optical switch or optical multiplexer. The optical interface may be controlled by sensor device 505 in order to select a fiber cable on which to perform distance measurements. In implementations using multiple sensor devices 505, each sensor device 505 may be assigned a sensor identifier in order to identify network communications to/from each sensor device 505.

Each vibration platform 507 may include one or more devices capable of receiving, generating, storing, processing, and/or providing information, as described herein. For example, vibration platform 507 may include a vibration device 110 as described above in order to generate vibrations along paths of fiber cables. Vibration platform 507 may also include or be associated with a geographic location facility 508 that determines geographic coordinates (e.g., latitudes and longitudes, plus codes, etc.) associated with the location of vibration device 110 when vibration device 110 is generating vibrations along fiber cables. Example geographic location facilities may include a Global Positioning System (GPS) receiver, a GPS land-assisted receiver, a network location receiver (e.g., to receive geographic locations from Network 501), or other facility capable of determining geographic coordinates. Vibration platform 507 may further include a controller that includes interfaces to the vibration device 110 and geographic location facility 508, such that actuation of the vibration device 110 may be controlled and geographic coordinates associated with the vibration device 110 may be obtained, as well as network communication interface facilities to send/receive communications over network 501. In some implementations, vibration platforms 507 may receive information from and/or transmit information to sensor devices 505 and/or measurement platform 515 (e.g., using network 501).

Vibration platform 507 may also include a vehicle to provide transportation along the path of the fiber cables 517. The vehicle may take any form, including land vehicles (e.g., trucks, carts, all-terrain vehicles) or aerial vehicles (e.g., drones). In some implementations, the vehicle may be autonomous or semi-autonomous (e.g., route directed, partially route directed, etc.), and vibration platform 507 may receive routing directions in order to perform vibrations along the path of fiber cables.

Measurement platform 515 includes one or more devices that identify locations of deployed fiber cables based on vibrations. Measurement platform 515 may include facilities that perform correlation of cable distance data with vibration location data, store the resulting correlation data in an associated data structure (e.g. a database, flat files, etc.) and perform location determinations based on cable distance data, as well as network communication interface facilities to send/receive communications over network 501. Accordingly, measurement platform 515 may implement interfaces that: allow for receipt of cable distance data as described herein, allow for receipt of location data as described herein, allow for receipt of requests for geographic coordinates associated with fiber cables as described herein, return results of requests for geographic coordinates associated with fiber cables as described herein, and the like. Such interfaces may be implemented using typical interfacing technologies, such as Hypertext Transfer Protocol (HTTP). In some implementations, measurement platform 515 may also include or be associated with a user interface facility that provides a display of geographic coordinates (or representations based on geographic coordinates) and other information. In some implementations, measurement platform 515 may receive information from and/or transmit information to one or more sensor devices 505 and/or vibration platform 507 (e.g., using network 501).

In some implementations, measurement platform 515 may be hosted in a cloud computing environment 610. Notably, while implementations described herein with reference to FIG. 6 describe measurement platform 515 as being hosted in cloud computing environment 610, in some implementations, measurement platform 515 may not be cloud-based (i.e., may be implemented outside of a cloud computing environment) or may be partially cloud-based.

Cloud computing environment 610 includes an environment that hosts measurement platform 515. Cloud computing environment 610 may provide computation, software, data access, storage, etc., services that do not require end-user knowledge of a physical location and configuration of system(s) and/or device(s) that host measurement platform 515. As shown, cloud computing environment 610 may include a group of computing resources 620 (referred to collectively as "computing resources 620" and individually as "computing resource 620").

Computing resource 620 includes one or more personal computers, workstation computers, mainframe devices, or other types of computation and/or communication devices. In some implementations, computing resource 620 may host measurement platform 515. The cloud resources may include compute instances executing in computing resource 620, storage devices provided in computing resource 620, data transfer devices provided by computing resource 620, etc. In some implementations, computing resource 620 may communicate with other computing resources 620 via wired connections, wireless connections, or a combination of wired and wireless connections.

As further shown in FIG. 6, computing resource 620 includes a group of cloud resources, such as one or more applications ("APPs") 620-1, one or more virtual machines ("VMs") 620-2, virtualized storage ("VSs") 620-3, one or more hypervisors ("HYPs") 620-4, and/or the like.

Applications 620-1 includes one or more software applications or other executable components that may be provided to or accessed by sensor device 505 and/or vibration platform 507. For example, applications 620-1 may include software associated with measurement platform 515 and/or any other software capable of being provided via cloud computing environment 610. In some implementations, one application 620-1 may send/receive information to/from one or more other applications 620-1, via virtual machine 620-2.

Virtual machine 620-2 includes a software implementation of a machine (e.g., a computer) that executes programs like a physical machine. Virtual machine 620-2 may be either a system virtual machine or a process virtual machine, depending upon use and degree of correspondence to any real machine by virtual machine 620-2. A system virtual machine may provide a complete system platform that supports execution of a complete operating system ("OS"). A process virtual machine (e.g., a container) may execute a single program and may support a single process or group of processes. In some implementations, virtual machine 620-2 may execute on behalf of a user (e.g., a user of sensor device 505 or an operator of measurement platform 515), and may manage infrastructure of cloud computing environment 610, such as data management, synchronization, or long-duration data transfers.

Virtualized storage 620-3 includes one or more storage systems and/or one or more devices that use virtualization techniques within the storage systems or devices of computing resource 620. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations. In some implementations, correlation data may be stored in virtualized storage 620-3.

Hypervisor 620-4 may provide hardware virtualization techniques that allow multiple operating systems (e.g., "guest operating systems") to execute concurrently on a host computer, such as computing resource 620. Hypervisor 620-4 may present a virtual operating platform to the guest operating systems and may manage the execution of the guest operating systems. Multiple instances of a variety of operating systems may share virtualized hardware resources.

Network 501 includes one or more wired and/or wireless networks. For example, network 501 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. In some implementations, network 501 may receive information from and/or transmit information to sensor devices 505, vibration platforms 507 and/or measurement platform 515.

Fiber cables 517 are one or more fiber cables (such as fiber cable 117) capable of carrying optical signals. For example, fiber cables 517 may be deployed as part of a service provider network over a geographical area. Fiber cables 517 may be deployed as subterranean (e.g., underground) cables, overhead (e.g., aerial) cables, exterior cables, internal (e.g., on premises) cables, or any combination thereof. In some implementations, one or more fiber cables 517 may be partially deployed in similar geographic areas 518—for example, within the same conduit, same vault, same overhead stanchion (e.g. telephone pole), etc.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 500 may perform one or more functions described as being performed by another set of devices of environment 500.

Figure 5B:
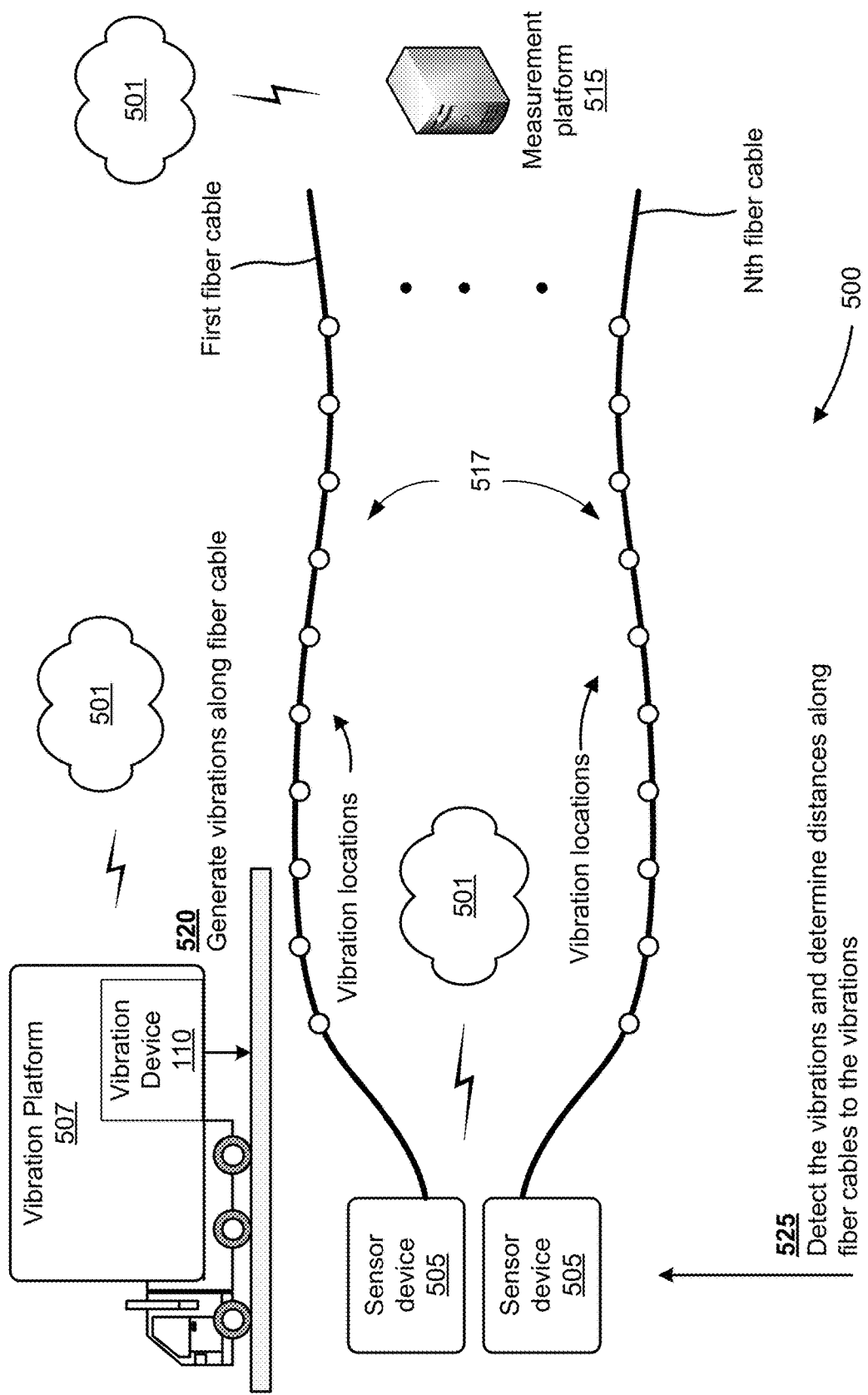

As further shown in FIG. 5B, and by reference number 520, vibration platform 507 may generate vibrations along deployed paths of each fiber cable. For example, vibration platform 507 may cause vibration device 110 to generate a vibration at a first location of a deployed path of the first fiber cable, and may then move to a second location of the deployed path of the first fiber cable. Vibration platform 507 may then cause vibration device 110 to generate a vibration at the second location of the deployed path of the first fiber cable, and then move to a third location of the deployed path of the first fiber cable. This process may repeat until vibrations are generated at various locations along the deployed path of the first fiber cable. Vibration platform 507 may repeat the aforementioned process, described in connection with the first fiber cable, for the other fiber cables of the multiple fiber cables. In some implementations, vibration device 110 generates the same vibration at each location along the deployed paths of each fiber cable, generates different vibrations at each location along the deployed paths of each fiber cable, and/or the like.

In some implementations, spacings between the locations of the generated vibrations are approximately uniform (e.g., one meter apart, five meters apart, ten meters apart, and/or the like) for each fiber cable, have different uniformity for different fiber cables, or are of varying spacing for one or more of the multiple fiber cables, and/or the like. In some implementations, the spacing between vibrations may be according to a uniform spacing as much as the environment allows. For example, where a feature of the environment prevents a vibration from being applied to a fiber cable, the vibration may be applied at a next (or closest) location. For aerial fiber cables, vibration locations may be specified to occur near stanchions supporting the fiber cable, such that the vibration may be transmitted through the stanchion to the fiber cable. Even where the stanchions are spaced farther apart than the typical vibration spacing distance, the location information generated will likely be sufficient, as any fault can be isolated to a fiber cable section between two stanchions. Alternatively, or additionally, where the vehicle supporting the vibration platform 507 is an aerial vehicle, the vibration spacing may continue as permitted by the airspace surrounding the fiber cable.

As further shown in FIG. 5B, and by reference number 525, sensor devices 505 may perform measurements to detect the vibrations generated along the deployed paths of the multiple fiber cables, and may determine distances along the multiple fiber cables to the vibrations. For example, sensor device 505 may provide a first optical signal (e.g., light) to the first fiber cable, and the first optical signal may be (at least partially) reflected back to sensor device 505 from a first location of a deployed path of the first fiber cable where a first vibration is applied. Sensor device 505 may detect the first optical signal reflected back from the first location to sensor device 505, and may determine a first cable distance from the first location to a location of sensor device 505. Sensor device 505 may provide a second optical signal to the first fiber cable, and the second optical signal may be reflected back to sensor device 505 from a second location of the deployed path of the first fiber cable where a second vibration is applied. Sensor device 505 may detect the second optical signal reflected back from the second location to sensor device 505, and may determine a second cable distance from the second location to the location of sensor device 505. This process may repeat until cable distances are determined by sensor device 505 for multiple locations along the deployed path of the first fiber cable. One or more sensor devices 505 may repeat the aforementioned process, described in connection with the first fiber cable, for the other fiber cables of the multiple fiber cables.

Figure 5C:
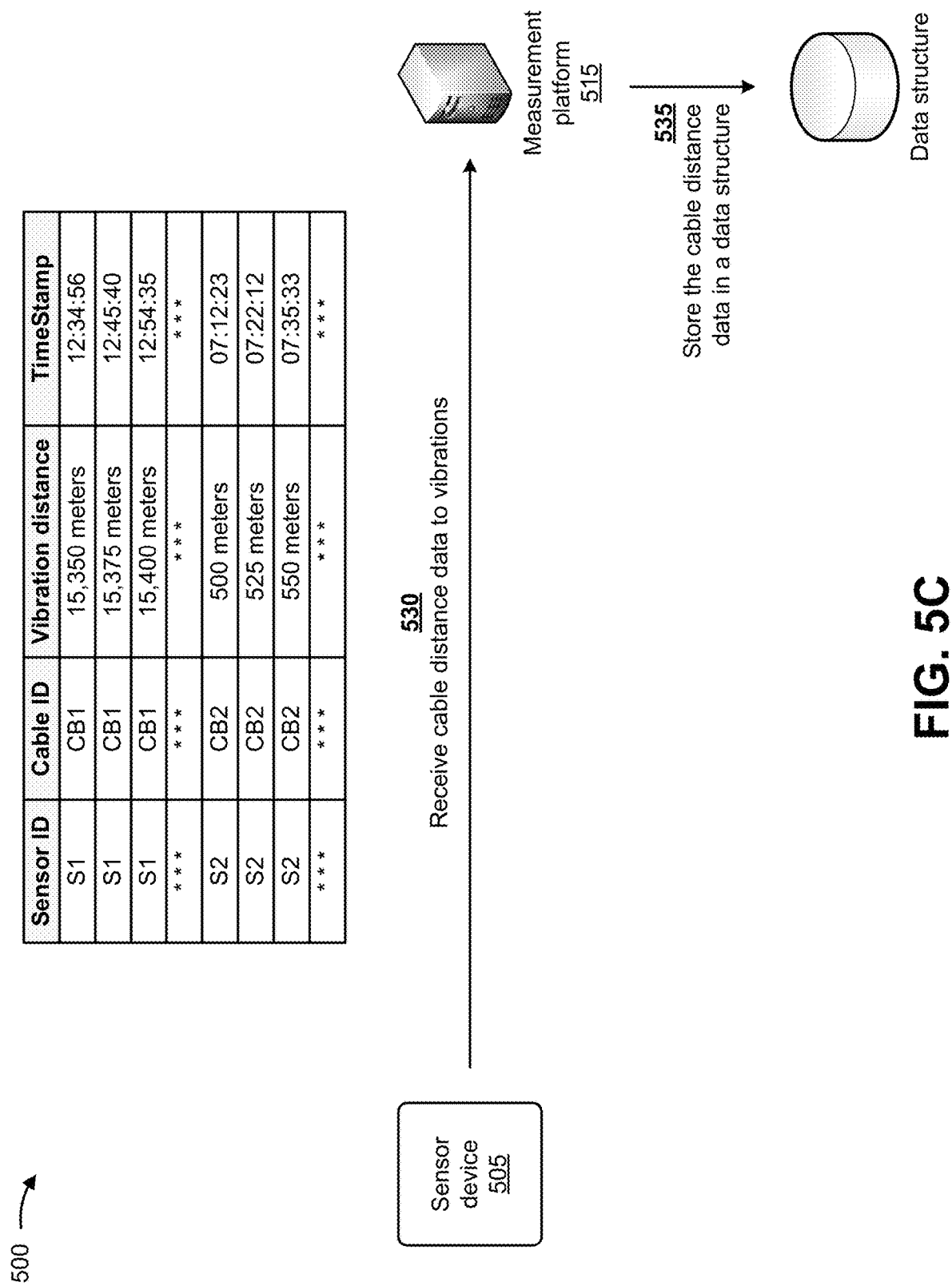

FIG. 5C illustrates operations of sensor devices 505. As shown in FIG. 5C, and by reference number 530, measurement platform 515 may receive, from sensor devices 505, cable distance data to vibrations. The cable distance data includes data identifying cable distances from the sensor device 505 to vibration locations along deployed paths of the multiple fiber cables. In some implementations, the cable distance data may include cable identifiers (IDs) that may be used to identify each of the multiple fiber cables. In some implementations, the cable distance data may also include a timestamp indicating a date and/or time the distance measurement was made. In some implementations, the cable distance data may include a sensor identifier associated with the sensor device 505 that performed the distance measurement. For example, as shown in FIG. 5C, the cable distance data may be represented as table with a vibration distance field that includes entries for corresponding cable distances along the first fiber cable from sensor device 505 to different vibration locations (e.g., 15,350 meters, 15,375 meters, 15,400 meters, and/or the like), corresponding cable distances along the second fiber cable from sensor device 105 to different vibration locations (e.g., 500 meters, 525 meters, 550 meters, and/or the like), and/or the like; (in some implementations) a cable ID field that includes entries for cable IDs of the first cable (CB1), the second cable (CB2), and/or the like; (in some implementations) a timestamp field that includes entries for date and/or time data reflecting the date/time when the measurement was taken; and (in some implementations) a sensor ID field that includes entries for sensor identifiers associated with the sensor device 505 that performed the measurement. Depending on the process used to provide the information to measurement platform 515, the information represented in the table may be provided as individual cable distance data or as a collection of cable distance data, and may be provided after each measurement is taken, periodically (in which case a collection of cable distance data may be sent), and/or upon request by measurement platform 515 (further described below). As further shown in FIG. 5C, and by reference number 535, measurement platform 515 may store the cable distance data in a data structure (e.g., a database, a table, a list, and/or the like) associated with measurement platform 515

In some implementations, the cable distance data is collected once by sensor device 505, provided to measurement platform 515, and stored in the data structure. Alternatively, if one or more deployed routes of one or more of the multiple fiber cables are updated (e.g., new sections of fiber cable are deployed), sensor device 505 (and vibration platform 507) may repeat the process described herein in order to collect updated cable distance data for the one or more of the updated multiple fiber cables. Sensor device 505 may provide the updated cable distance data to measurement platform 515, and measurement platform 515 may replace the cable distance data for the one or more of the updated multiple fiber cables with the updated cable distance data for the one or more of the multiple fiber cables. In some embodiments, the processes described herein may be performed periodically (regardless of updates to the fiber cables) in order to refresh the cable distance data and ensure current accuracy.

Figure 5D:
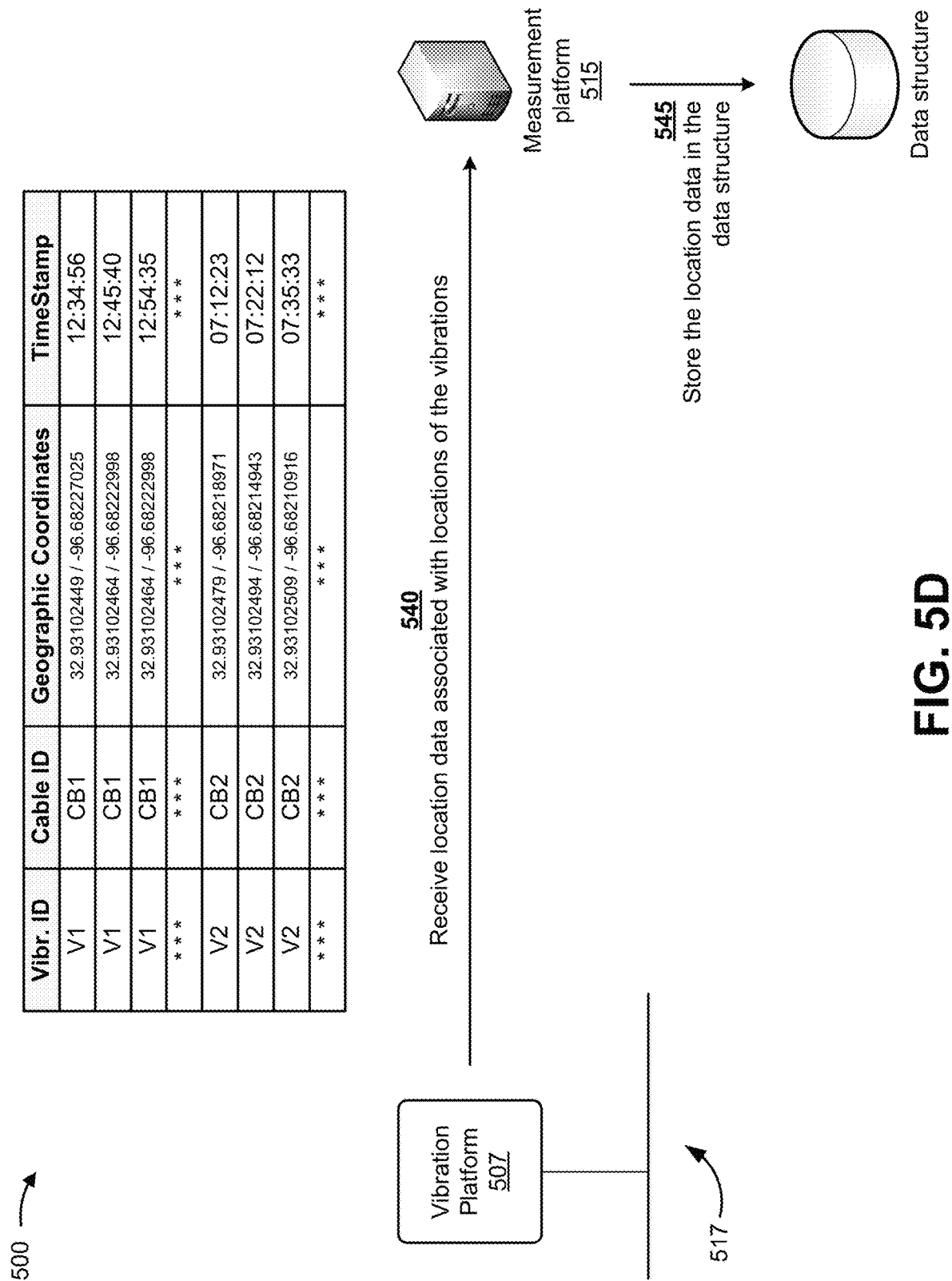

FIG. 5D illustrates operations of vibration platforms 507. As shown in FIG. 5D, and by reference number 540, a vibration platform 507 may perform a vibration event (i.e., a time/place at which vibration device 110 was activated to cause a vibration of a fiber cable) at a location on the path of a fiber cable 517. Vibration platform 507 may send to measurement platform 515—and measurement platform 515 may receive from vibration platform 507—location data associated with the locations of vibration events. Location data includes geographic coordinate data of the location where vibration occurred (e.g., latitudes and longitudes, point codes, etc.). In some implementations, the vibration platform 507 obtains the geographic coordinate data from a geographic location facility associated with the vibration platform 507 (e.g., a GPS facility). In some implementations, location data may include data identifying a fiber cable being vibrated (e.g., a cable ID). In some implementations, the location data may also include a timestamp associated with the date/time the vibration event occurred for the fiber cable. In some implementations, location data may include an identifier associated with the vibration platform 507 that performed the vibration event. For example, as shown in FIG. 5D, the location data may be represented as a table with a geographic coordinate field that includes entries for corresponding geographic coordinate data associated with the first fiber cable and the vibration events (e.g., 32.93102449/−96.68227025, 32.93102464/−96.68222998, 32.93102464/−96.68222998, and/or the like), corresponding geographic coordinate data associated with the second fiber cable and the vibration events (e.g., 32.93102479/−96.68218971, 32.93102494/−96.68214943, 32.93102509/−96.68210916, and/or the like); (in some implementations) a cable ID field that includes entries for cable IDs of the first cable (CB1), the second cable (CB2), and/or the like; (in some implementations) a time stamp field that includes entries for dates and/or times when vibration was applied at the geographic coordinates, and the like; and (in some implementations) a vibration platform ID that includes entries for the identifiers associated with the vibration platform 507 that performed the vibration event. Depending on the process used to provide the location data to measurement platform 515, the information represented in the table may be provided as individual location data or as a collection of location data, and may be provided after each vibration event, periodically (in which case a collection of location data may be sent), and/or upon request by measurement platform 515. As further shown in FIG. 5D, and by reference number 545, measurement platform 515 may store the location data in a data structure (e.g., a database, a table, a list, and/or the like) associated with measurement platform 515.

In some implementations, the location data is collected once by vibration platform 507, provided to measurement platform 515, and stored in the data structure. Alternatively, if one or more deployed routes of one or more of the multiple fiber cables are updated, sensor device 505 and vibration platform 507 may repeat the process described herein in order to collect updated location data for the one or more of the updated multiple fiber cables. Vibration platform 507 may provide the updated location data to measurement platform 515, and measurement platform 515 may replace the location data for the one or more of the updated multiple fiber cables with the updated location data for the one or more of the multiple fiber cables. In some embodiments, the processes described herein may be performed periodically (regardless of updates to the fiber cables) in order to refresh the location data and ensure current accuracy.

Figure 5E:
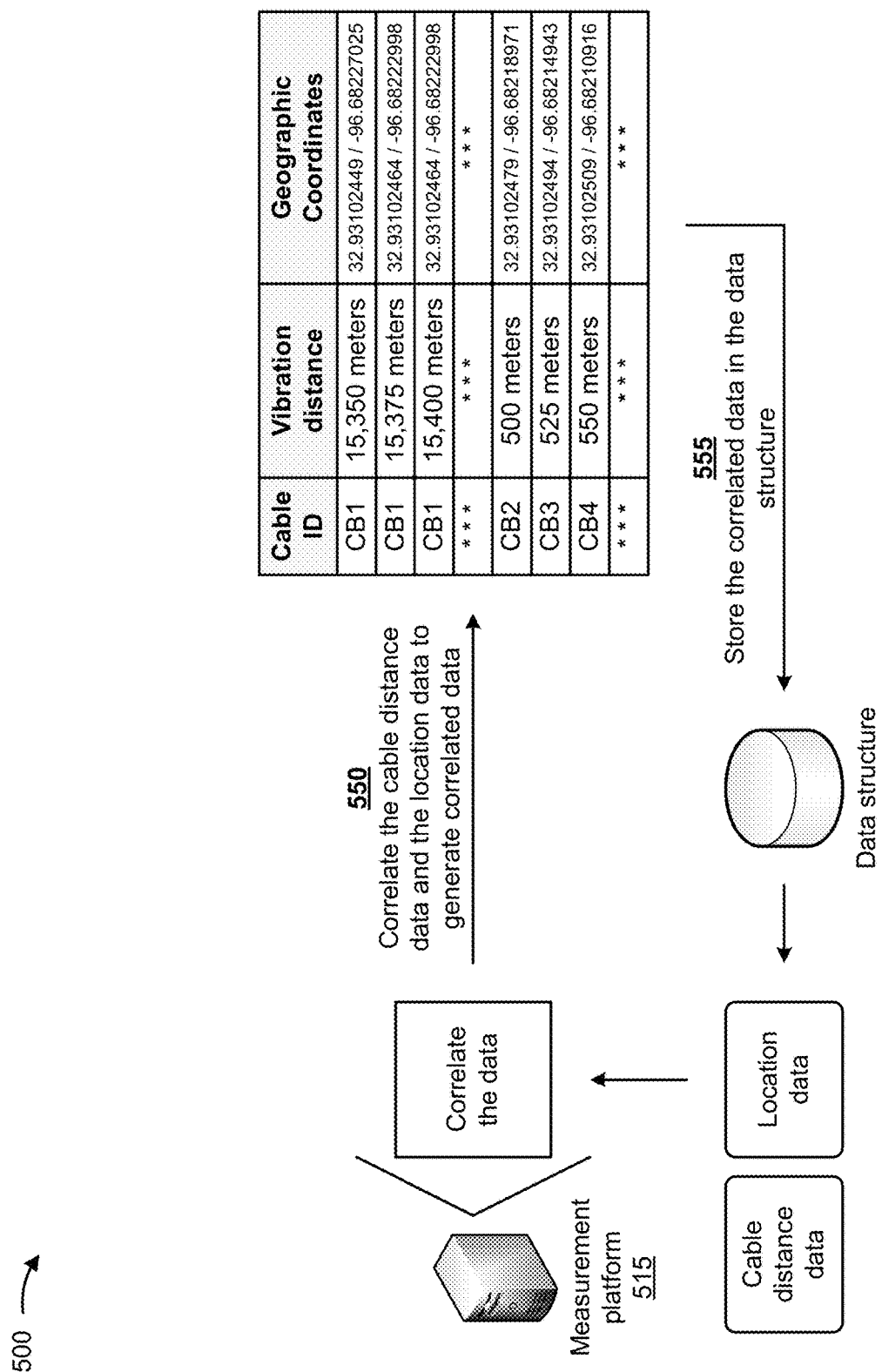

As shown in FIG. 5E, and by reference number 550, measurement platform 515 may correlate the cable distance data and the location data to generate correlated data. For example, measurement platform 515 may create a data structure (e.g., a table) that merges the vibration distance field of the cable distance data with the geographic coordinate field of the location data. The created data structure may correspond to the correlated data. In some implementations where multiple fiber cables are measured, the data structure may also include cable IDs or other identifiers to distinguish between the measurements for each fiber cable. As shown in FIG. 5E, the correlated data may be represented as a table with a cable ID field that includes entries for cable IDs of the first cable (CB1), the second cable (CB2), and/or the like; a vibration distance field that includes entries for corresponding cable distances along the first fiber cable to vibrations (e.g., 15,350 meters, 15,375 meters, 15,400 meters, and/or the like), corresponding cable distances along the second fiber cable to vibrations (e.g., 500 meters, 525 meters, 550 meters, and/or the like), and/or the like; and a geographic coordinate field that includes entries for corresponding geographic coordinate data associated with the first fiber cable and the different vibration locations (e.g., 32.93102449/−96.68227025, 32.93102464/−96.68222998, 32.93102464/−96.68222998, and/or the like), corresponding geographic coordinate data associated with the second fiber cable and the different vibration locations (e.g., 32.93102479/−96.68218971, 32.93102494/−96.68214943, 32.93102509/−96.68210916, and/or the like), and/or the like. In some implementations, additional fields may also be used, such as a timestamp field that may represent a date/time when the correlated data was last updated, and one or more source fields that indicate identifiers of the devices/platforms that provided the cable distance data/location data.

As further shown in FIG. 5E, and by reference number 555, measurement platform 515 may store the correlated data in the data structure associated with measurement platform 515. In some implementations, the correlated data is determined once by measurement platform 515, and stored in the data structure. Alternatively, if one or more deployed routes of one or more of the multiple fiber cables are updated, sensor devices 505 and vibration platforms 507 may repeat the process described herein in order to collect updated cable distance data and updated location data for the one or more of the updated multiple fiber cables. Sensor devices 505 may provide the updated cable distance data to measurement platform 515, and vibration platforms 507 may provide the updated location data to measurement platform 515. Measurement platform 515 may determine updated correlated data for the one or more of the updated multiple fiber cables based on the updated cable distance data and the updated location data. Measurement platform 515 may replace the correlated data for the one or more of the updated multiple fiber cables with the updated correlated data for the one or more of the multiple fiber cables. In some embodiments, the processes described herein may be performed periodically (regardless of updates to the fiber cables) in order to refresh the location data and ensure current accuracy.

Figure 7:
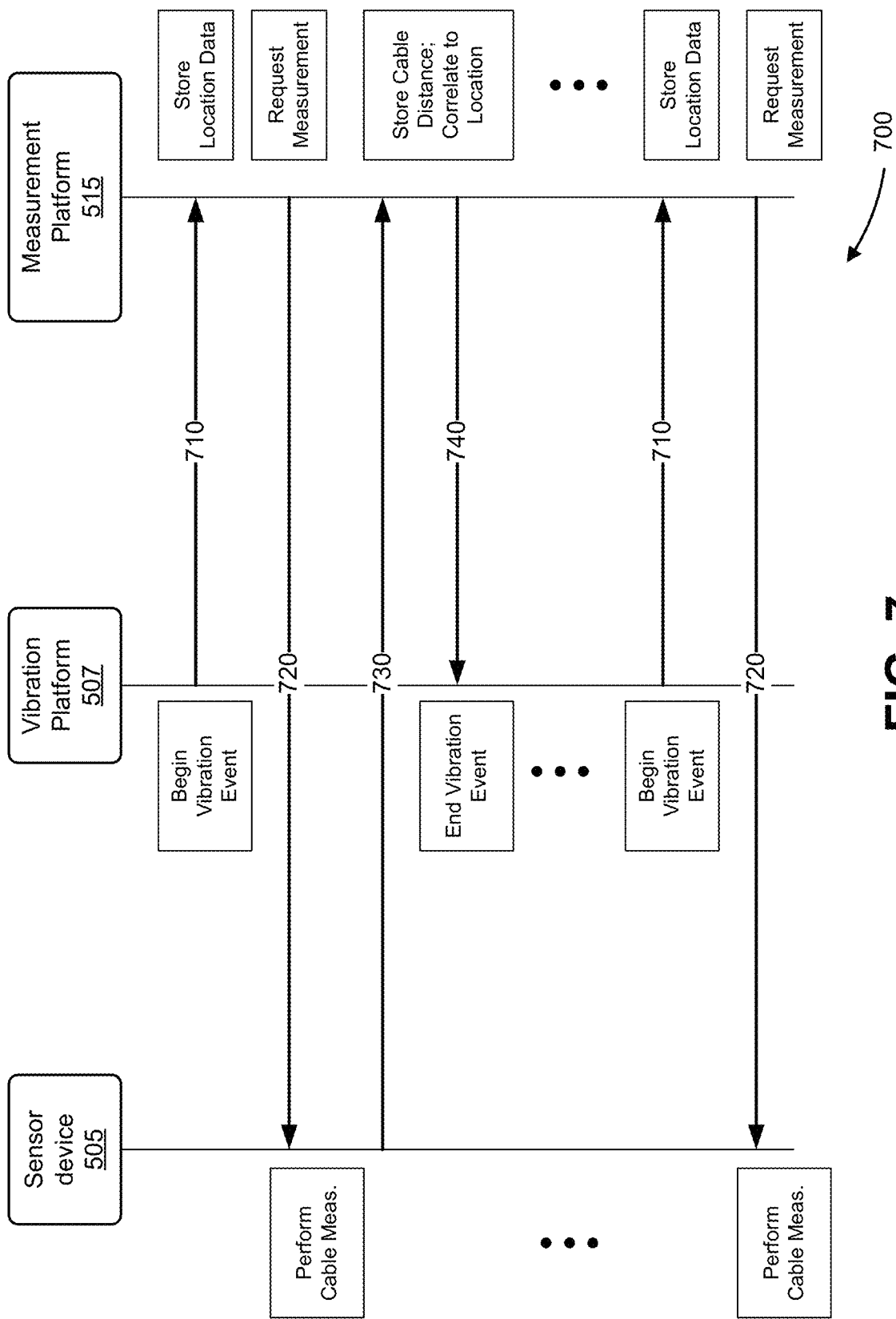
FIG. 7 is a diagram of an example correlation process described herein.

Correlation of the cable distance data and vibration location data can be achieved in a number of ways. In some implementations, correlation may be according to a "synchronous" process involving sensor device 505, vibration platform 507 and measurement platform 515, such that each component performs individual actions upon request and/or only after the prior component has provided indication that it has completed its prior action. FIG. 7 provides an illustration of a possible synchronous correlation procedure 700, in this case coordinated by measurement platform 515. As shown, at reference 710, vibration platform 507 may provide a message indicating it is at a vibration location and is commencing a vibration event (e.g., it has activated the vibration device 110). The message may include the location data described above (e.g., the geographic coordinate data, and (depending on implementation) a cable ID, platform ID and/or a timestamp). The message may be sent to measurement platform 515, and measurement platform 515 may record the location data. At reference 720, measurement platform 515 may send a message to a sensor device 505 requesting that a cable measurement be performed. In some implementations, the message to the sensor device 505 may include a cable ID and/or other identifiers which measurement platform 515 may use to perform correlation to location data. In some implementations where multiple sensor devices 505 are used, measurement platform 515 may select the sensor device 505 to receive the message, for example, based on the cable being measured, and may use a sensor identifier to send the message to the correct sensor device 505. The message may be received at sensor device 505 via its network interface and controller facilities that allow for requests to perform cable measurements.

In response to the message from measurement platform 515, a sensor device 505 associated with the fiber cable being vibrated by vibration platform 507 may initiate a measurement of the fiber cable (e.g., using its optical measurement capability). At reference 730, the sensor device 505 may provide a message to measurement platform 515 that includes cable distance data for the fiber cable experiencing the vibration (e.g., distance data and (depending on implementation) a cable ID, a device ID and/or timestamp). The message may be received by measurement platform 515 and stored. Measurement platform 515 may perform correlation of the cable distance data and the location data to create correlated data for the fiber cable at the vibration location (e.g., as described above). In some implementations, measurement platform 515 may send a message to vibration platform 507 to cause the vibration platform 507 to stop the vibration device 110 (reference 740). The vibration platform 507 may then proceed to the next vibration location for the fiber cable, and the process described above may be performed again at the next vibration location.

The process described in FIG. 7 may use additional or alternate methodologies in some implementations. For example, in some implementations measurement platform 515 may send a message to vibration platform 507 to request a vibration event. In some implementations measurement platform 515 may not send the message to cause the vibration platform to end the vibration event, but instead the vibration event may automatically end after a time period. In some implementations, the messages sent by the vibration platform 507 and/or sensor device 505 may be sent to each other in addition to (or instead of) measurement platform 515, and the respective devices/platforms may take the actions described above in response to such messages. In some implementations, at some point during process 700, measurement device 515 may request the cable distance data from sensor device 505 and/or the location data from vibration platform 507.

In some implementations, correlation of the cable distance data and the location data may be according to a relatively "asynchronous" process that allows each component to operate and provide their data to measurement platform semi-independently, which may be useful in implementations involving multiple sensor devices 505, vibration platforms 507 and/or fiber cables 517. As one example, one or more vibration platforms 507 may apply vibration to the fiber cables for a period of time, and notify one or more sensor devices 505 associated with the fiber cable(s) being vibrated that measurements should be made. Vibration platforms 507 may report location data to measurement platform 515 after each vibration event, or after a period of time (in which case location data for multiple vibration events may be reported together). Likewise, sensor devices 505 may report cable distance data to measurement platform 515 after each measurement is made, or after a period of time (in which case cable distance data for multiple vibration events may be reported together). Measurement platform 515 may perform correlation after a period of time by correlating stored location data and cable distance data, for example, based on timestamps, cable IDs and/or other identifiers.

Figure 8A:
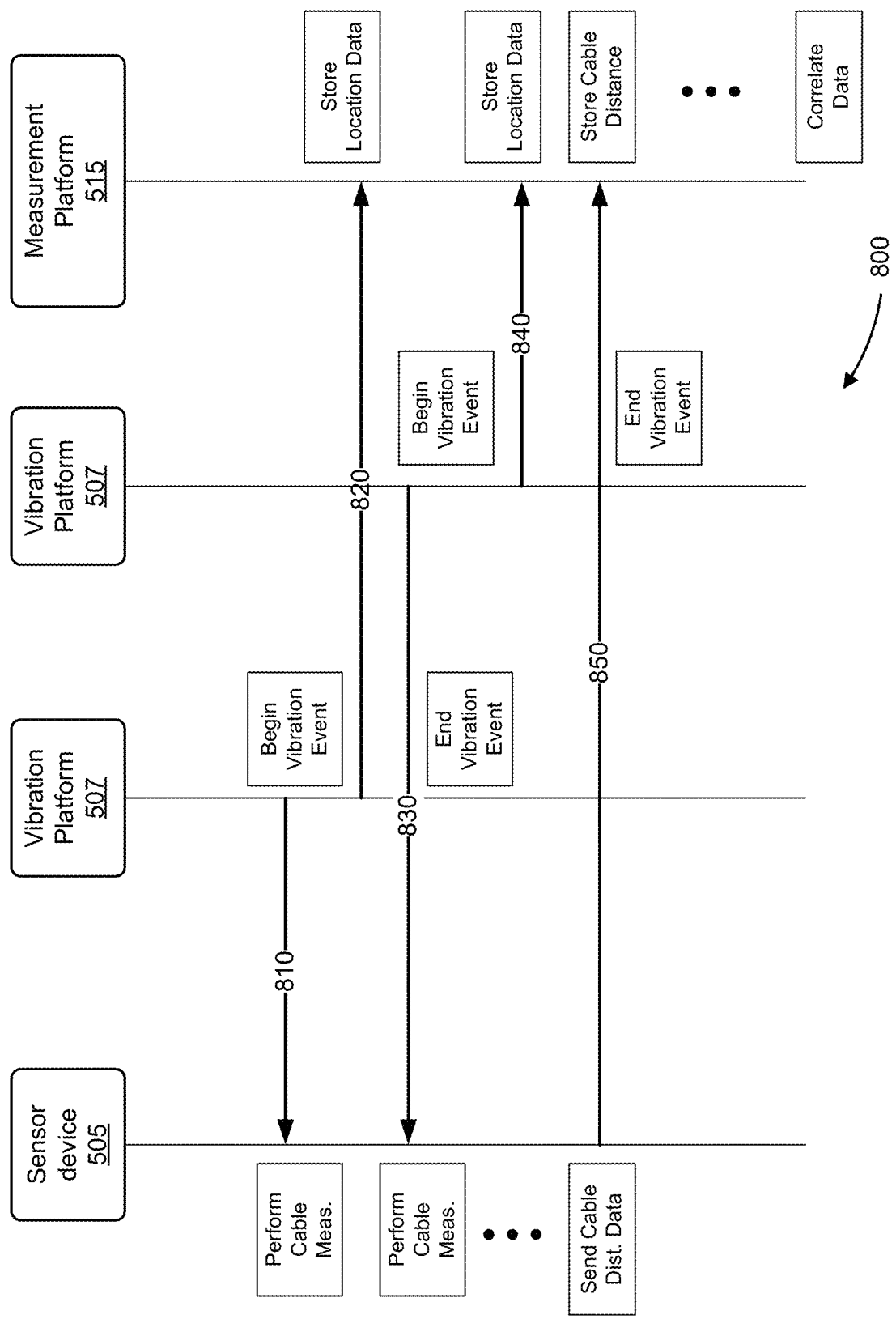
FIGS. 8A-8C are diagrams of another example correlation process described herein.

FIG. 8A illustrate an example of a possible asynchronous procedure 800. As shown in FIG. 8A, a first vibration platform 507 may proceed to a specified vibration location for a fiber cable and begin a first vibration event. The first vibration platform 507 may send a message to sensor device 505 associated with the fiber cable, and the message may indicate that a first vibration event has begun and a measurement of cable distance to a vibration should be made for the fiber cable (reference 810). The message may be received by sensor device 505 (e.g., through its interface and controller), and a distance measurement of the fiber cable may be made using the optical components of sensor device 505. The sensor device 505 may store the cable distance data resulting from the measurement (although in some implementations the sensor device 505 may send a message to measurement platform 515 containing the cable distance data—see reference 850). The first vibration platform 507 may send location data associated with the first vibration event to measurement platform 515 (reference 820), and measurement platform 515 may store the location data.

A second vibration platform 507 may also send a message to sensor device 505 associated with the fiber cable, and the message may indicate that a second vibration event has begun, and a measurement of cable distance to a vibration should be made for the fiber cable (reference 830). The message may be received by sensor device 505 (e.g., through its interface and controller), and a distance measurement of the fiber cable may be made using the optical components of sensor device 505. The sensor device 505 may store the cable distance data resulting from the measurement (although in some implementations the sensor device 505 may send a message to measurement platform 515 containing the cable distance data—see reference 850). The second vibration platform 507 may send location data associated with the second vibration event to measurement platform 515 (reference 840), and measurement platform 515 may store the location data.

Sensor device 505 may periodically send cable distance data to measurement platform 515 (reference 850). In some implementations, sensor device 505 may send cable distance data after each measurement is completed. In other implementations, sensor device 505 may send a single message periodically that includes multiple cable distance data after multiple measurements have been made. In such cases, the sensor device 505 may store cable distance data associated with each vibration event until it can be included in a message to measurement platform 515.

Measurement platform 515 may periodically perform correlation of cable distance data and vibration location data at some point after receiving such data. In some implementations, timestamps included in the cable distance data and location data may be used to perform the correlation. For example, where the timestamps of the cable distance data and vibration location data match, the cable distance data and vibration location data may be determined to be correlated, and included in the correlated data. The matching of timestamps may be subject to thresholds of skew, for example, to account for differences in when vibrations may be commenced and when measurements are made. For example, measurement platform 515 may use a skew threshold of 10 seconds to account for a difference between when a vibration event started and when the measurement was made by sensor device 505. The threshold may be set based on the periodicity of the measurements of sensor device 505 and/or the expected gaps between when vibration events may occur.

As another example of an asynchronous procedure, one or more vibration platforms 507 may apply vibration to the fiber cables 517 for a period of time, and report location data to measurement platform 515 after each vibration event, or after a period of time (in which case location data for multiple vibration events may be reported together), but the vibration platforms 507 do not need to request that a sensor device 505 make measurements. Instead, sensor devices 505 may be configured or otherwise controlled to operate in a "continuous" measurement mode, whereby they make measurements on the fiber cable periodically over a time period, with the expectation that some of the measurements will occur during times when a vibration event is occurring on a fiber cable to which they are associated. The periodicity of the measurements may be set to any suitable number, such as a value that is unlikely to miss a vibration event (e.g., every 5 seconds) but allows for the avoidance of residual signal reflections in the fiber cable. Sensor devices 505 may report cable distance data to measurement platform 515 in various ways. For example, a sensor device 505 may report all measurements made during the time period of the continuous operation mode to measurement platform 515. Alternatively, a sensor device 505 may only report cable distance measurements that deviate from a maximum cable length— measurements that are less than the maximum cable length likely indicate that a vibration has been detected along the path of the fiber cable, whereas measurements that are the maximum length of the cable indicate that no vibration is present. Sensor device 505 may also perform validation of the measurements prior to reporting, for example, by comparing more than one measurement over a sample period to confirm that the measurement is related to a vibration event. Sensor devices 505 may report cable distance data to measurement platform 515 after each measurement is made, or after a period of time (in which case cable distance data for multiple vibration events may be reported together). Measurement platform 515 may perform correlation after a period of time by correlating stored location data and cable distance data, for example, based on timestamps, cable IDs and/or other identifiers.

Figure 8B:
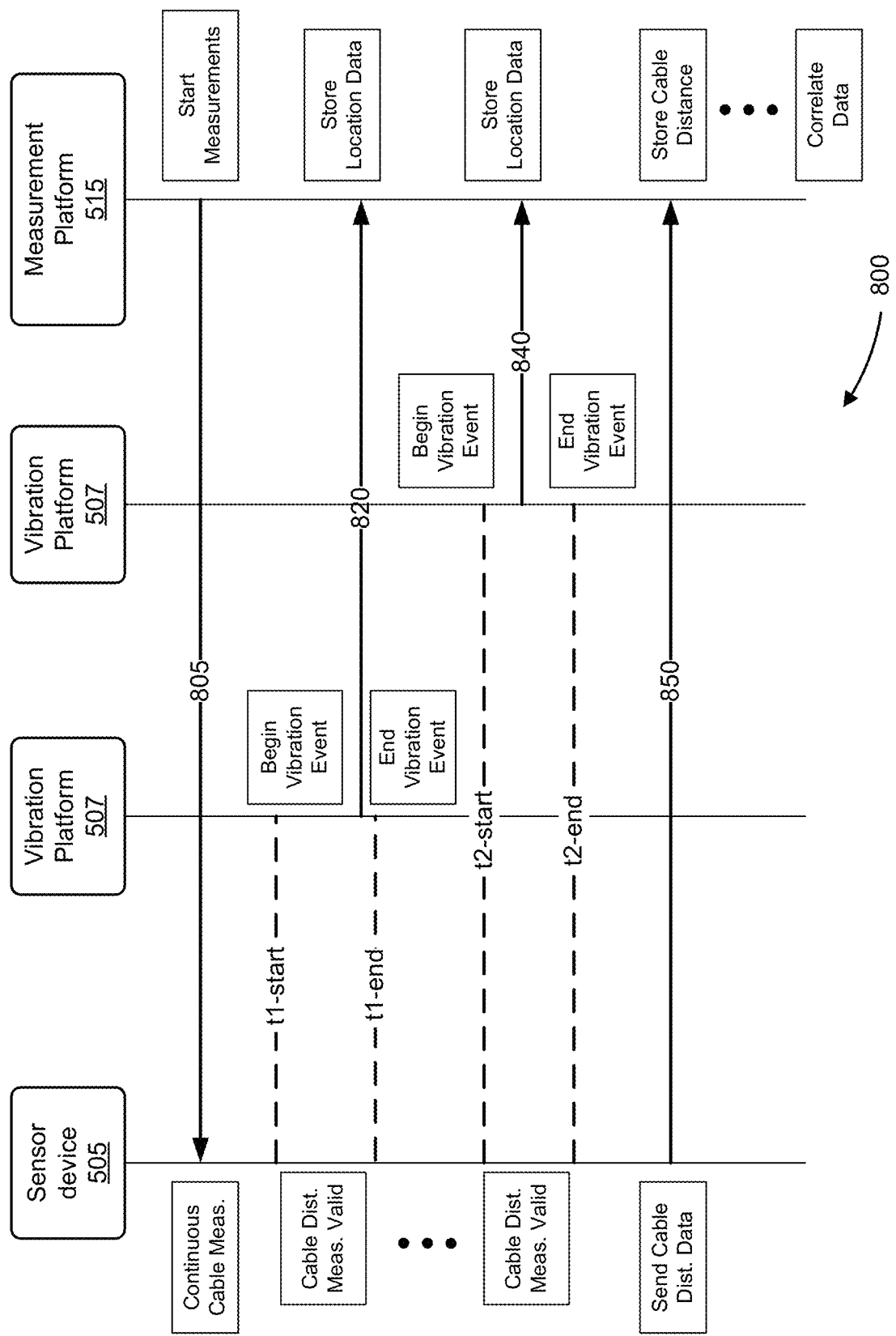

FIG. 8B illustrates another example of possible asynchronous procedure 800. As shown in FIG. 8B, a sensor device 505 may receive a message that includes an indication that it should operate in a continuous measurement mode (reference 805). The message may be sent by measurement platform 515 and received by sensor device 505 via its interface and controller. Sensor device 505 may commence continuous measurement mode. Continuous measurement mode may be performed according to various parameters (which, in some implementations, may be specified in the message). For example, the periodicity of the performance of each measurement to the fiber cable(s), the duration of the time period during which continuous measurement mode should operate, one or more fiber cables that should be measured, and the like.

Similarly, as described above with respect to FIG. 8A, a first vibration platform 507 may proceed to a specified first vibration location for a fiber cable and begin a first vibration event at time "t1-start." The first vibration platform 507 may send location data associated with the first vibration event to measurement platform 515 (reference 820), and measurement platform 515 may store the location data. The first vibration event may continue until a "time t1-end." A second vibration platform 507 may proceed to a second vibration location for the fiber cable, and begin a second vibration event at time "t2-start." The second vibration platform 507 may send location data associated with the second vibration event to measurement platform 515 (reference 840), and measurement platform 515 may store the location data. The second vibration event may continue until a time "t2-end." In this example, neither the first vibration platform 507 nor second vibration platform 507 sends a message to sensor device 505.

Sensor device 505, operating in continuous measurement mode, may detect the first vibration event at some time after time "t1-start." For example, the sensor device 505 may determine that one of the cable distance measurements being made on the fiber cable is less than a maximum cable length. In some implementations, sensor device 505 may validate that the measurement is associated with a vibration event, for example, by requiring two or more measurements over a period of time to be similar (e.g., within a threshold difference between each other). The sensor device 505 may store the cable distance data resulting from the measurement determined to be associated with the first vibration event (although in some implementations the sensor device 505 may send a message to measurement platform 515 containing the cable distance data—see reference 850). Likewise, sensor device 505 may detect the second vibration event at some time after time "t2-start." The sensor device 505 may store the cable distance data resulting from the measurement determined to be associated with the second vibration event (although in some implementations the sensor device 505 may send a message to measurement platform 515 containing the cable distance data—see reference 850).

Sensor devices 505 may report cable distance data to measurement platform 515 periodically (reference 850), similarly as described above with respect to FIG. 8A. Measurement platform 515 may periodically perform correlation of cable distance data and vibration location data at some point after receiving such data, similarly as described above. In some implementations, sensor device 505 may exit continuous measurement mode automatically, for example, after the end of a specified time period. Alternatively, or additionally, measurement platform 515 may send a message to sensor device 505 to exit continuous measurement mode.

Figure 8C:
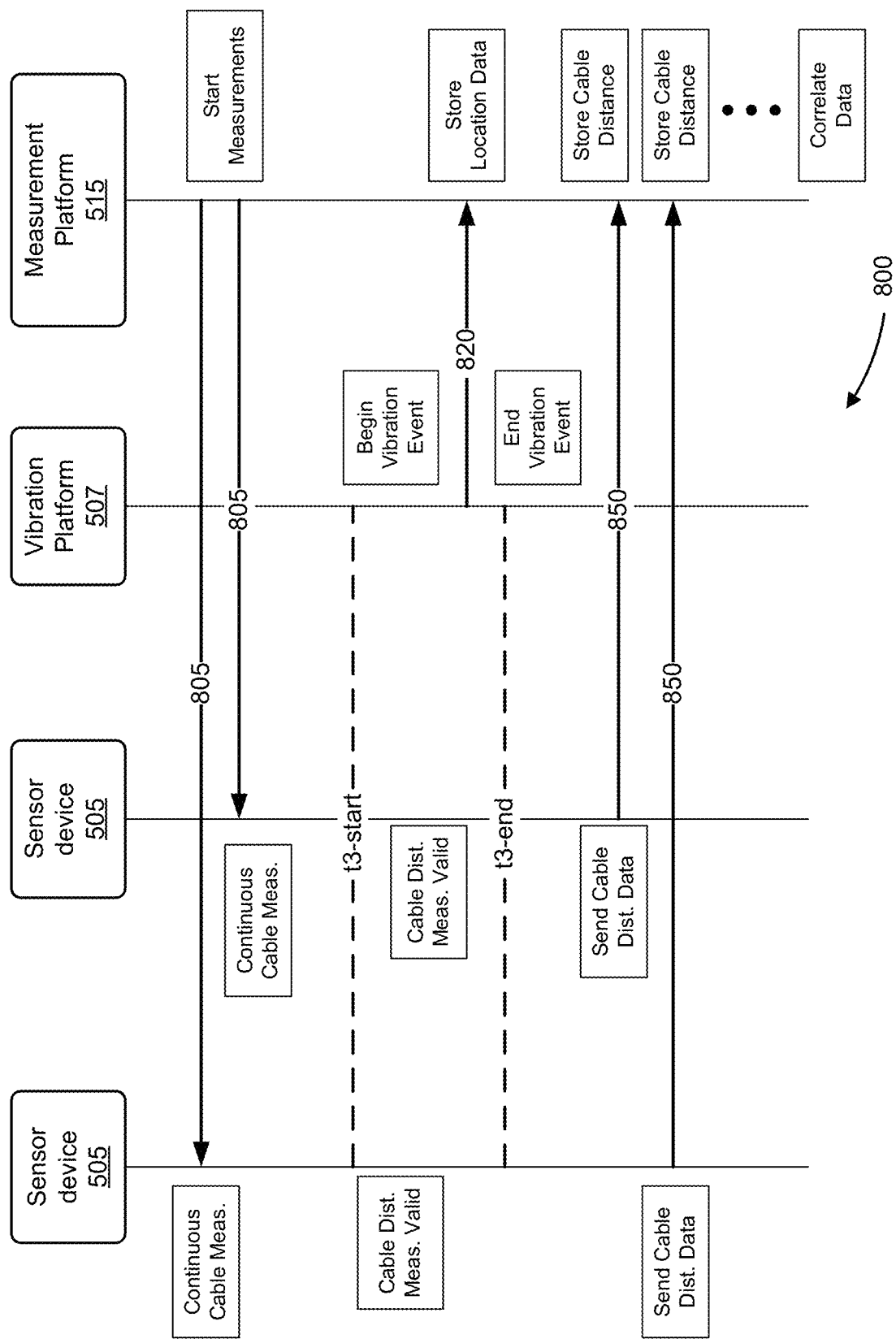

An additional benefit to the configurations described herein is the capability to perform vibration sensing on multiple fiber cables at a common location, which increases the efficiency of the correlation process. For example, in a network with multiple fiber cables, multiple cables may be located at the same geographic locations (e.g., a stanchion, a vault, a buried conduit). FIG. 6 depicts an example where two fiber cables are co-located at a geographic location 518. A vibration event at a common location will be experienced by the multiple fiber cables at that location, and therefore may be detected by multiple sensor devices 505 associated with the fiber cables that are so co-located. FIG. 8C illustrates an example of such a situation. Measurement platform 515 sends a message to a first sensor device 505 and a second sensor device 505 for each to enter continuous measurement mode (reference 805). The first sensor device 505 may be associated with a first fiber cable, and the second sensor device 505 may be associated with a second fiber cable. At some time thereafter, a vibration platform 507 is deployed to a location where both the first fiber cable and the second fiber cable are co-located. The vibration platform 507 begins a vibration event at the location, and notifies measurement platform 515 of the location data associated with the vibration event (reference 820). The vibration event starts at time "t3-start," and is continued by the vibration platform until time "t3-end."

The first sensor device 505, operating in continuous measurement mode, may detect the vibration event on the first fiber cable at some time after time "t3-start." For example, the first sensor device 505 may determine that one of the cable distance measurements being made on the first fiber cable is less than a maximum cable length. The first sensor device 505 may store (or immediately send to measurement platform 515) the cable distance data resulting from the measurement determined to be associated with the vibration event for the first fiber cable (reference 850). Likewise, the second sensor device 505 may detect the vibration event on the second fiber cable at some time after time "t3-start." The second sensor device 505 may store (or immediately send to measurement platform 515) the cable distance data resulting from the measurement determined to be associated with the vibration event for the second fiber cable (reference 850). Measurement platform 515 may provide correlation of the cable distance data to location data associated with the vibration event similarly to that described above. For example, measurement platform 515 may use timestamps associated with the location data and the cable distance data to correlate the cable distance data to the geographic coordinate data reported in the location data.

According to the systems and methods described above, a set of correlation data may be created to allow for maintaining precise geographic locations correlated to fiber distance across a collection of fiber cables. The use of precise geographic location information that is automatically collected and correlated to cable distance measurements allows for the creation of a more precise dataset of cable locations across a large geographic area and a period of time.

Figure 5F:
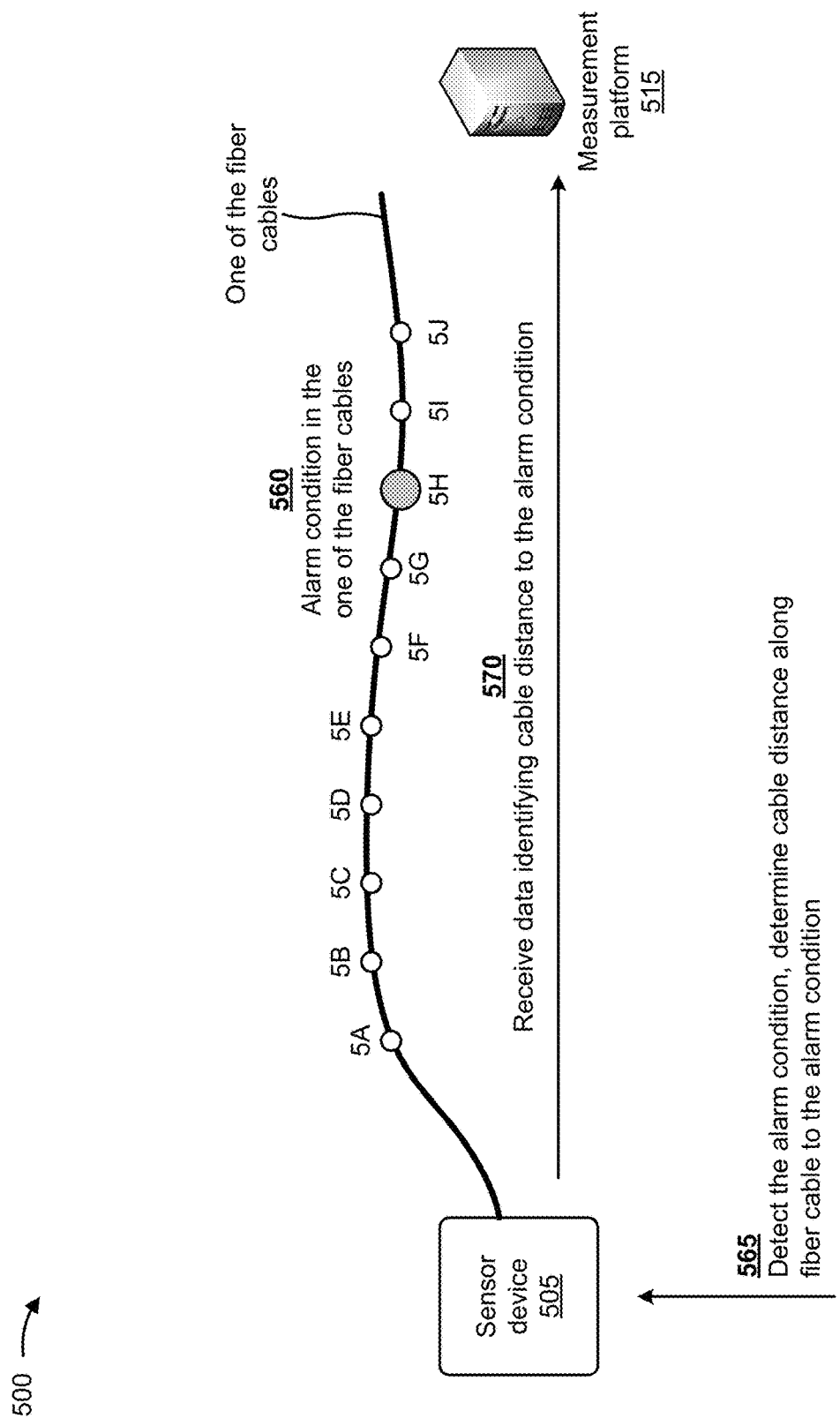

One of the benefits of such a collection of precise geographic locations correlated to fiber distances is in detecting, mitigating and/or resolving alarm conditions associated with fiber cables. As shown in FIG. 5F, and by reference number 560, an alarm condition may occur in the one of the fiber cables. The alarm condition may be a result of a fiber cut, a high loss splice point, a tightly bending point, or other fault associated with the one of the fiber cables. In some implementations, the alarm condition may correspond to a displacement of the one of the fiber cables (e.g., similar to a displacement induced on the one of the fiber cables by a vibration). The alarm condition may be detected by a network device (e.g., a network provider server) that manages a network associated with the multiple fiber cables. For the current example, if different cable distances along the one of the fiber cables are labeled 5A through 5J, the alarm condition may occur at a cable distance (e.g., from sensor device 505) associated with a location labeled 5H.

As further shown in FIG. 5F, and by reference number 565, sensor device 505 in response to the alarm condition may be instructed to determine a cable distance to a location of the cause of the alarm condition along the one of the fiber cables associated with the alarm condition. Continuing the current example, sensor device 505 may provide an optical signal to the one of the fiber cables associated with the alarm condition, and the alarm condition (e.g., a displacement or a fiber cut) at location 5H may cause the optical signal to be reflected back to sensor device 505 from location 5H. Sensor device 505 may detect the optical signal reflected back from the location of the alarm condition to sensor device 505, and may determine a cable distance from the location of the alarm condition to a location of sensor device 505.

As further shown in FIG. 5F, and by reference number 570, measurement platform 515 may receive, from sensor device 505, data identifying the cable distance along the one of the fiber cables associated with the alarm condition. For example, measurement platform 515 may receive data identifying the cable distance from the location of sensor device 505 to location 5H of the deployed path of the one of the fiber cables. The data identifying the cable distance may also include the cable ID associated with the one of the fiber cables.

As shown in FIG. 5G, and by reference number 575, measurement platform 515 may determine geographic coordinate data associated with the alarm condition based on the correlated data and the data identifying the cable distance along the one of the fiber cables associated with the alarm condition. Continuing the current example, and with reference to the data structure shown in FIG. 5E, if the one of the fiber cables is the first fiber cable (cable ID=CB1) and the cable distance along the first fiber cable to the alarm condition is measured to be 15,400 meters, measurement platform 515 may determine the geographic coordinate data associated with the alarm condition to be a latitude and longitude of 32.93102464 and −96.68222998, respectively.

Figure 5H:
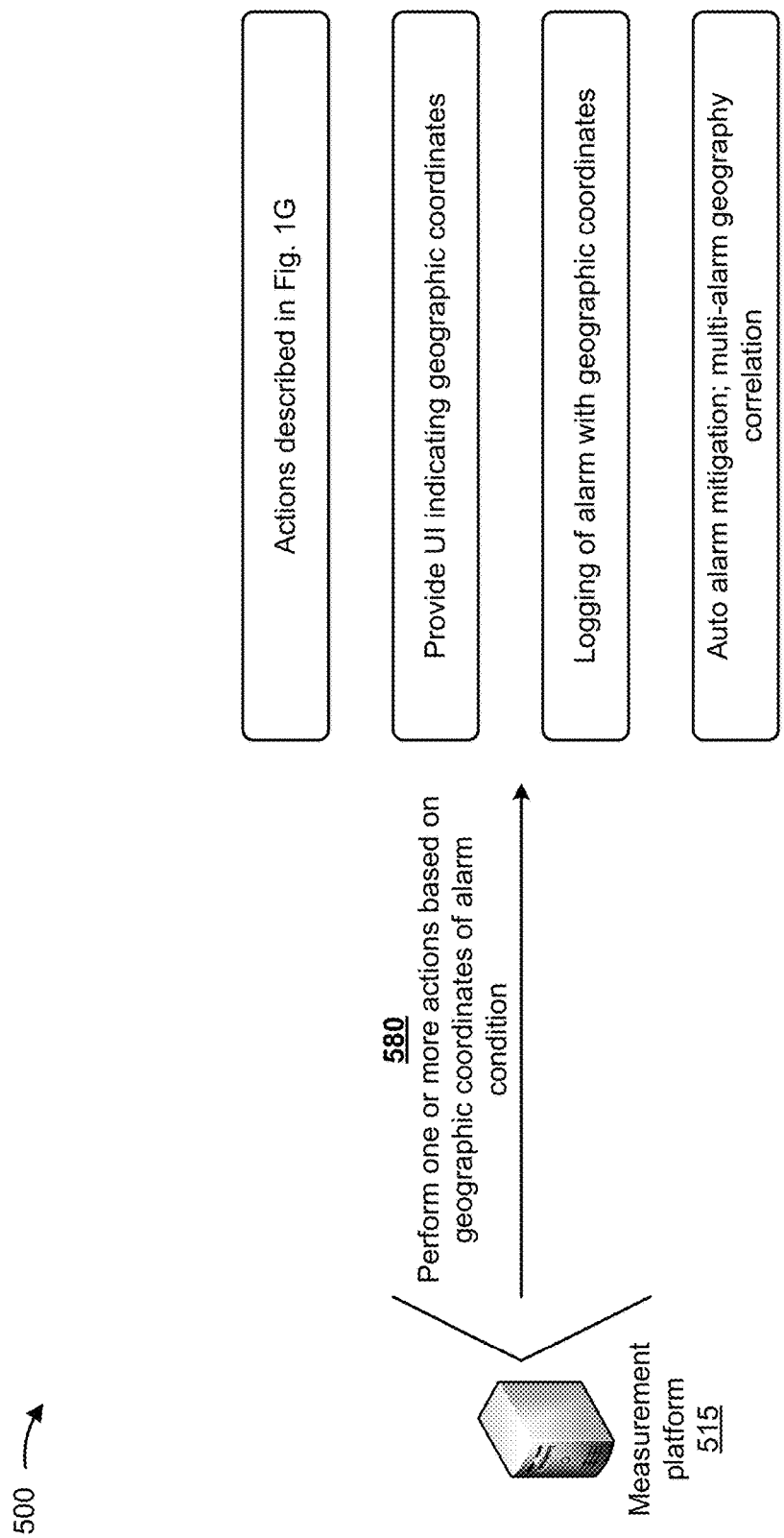

As shown in FIG. 5H, and by reference number 580, measurement platform 515 may perform one or more actions based on the geographic coordinates associated with the alarm condition. In some implementations, the one or more actions may include the actions described above with respect to FIG. 1G, such as determining directions to the alarm condition based on the geographic coordinate data associated with the alarm condition. For example, if measurement platform 515 determines that the geographic coordinate data associated with the alarm condition are a latitude and longitude of 32.93102464 and −96.68222998, measurement platform 515 may calculate directions to the alarm condition based on 32.93102464 latitude and −96.68222998 longitude and a selected starting location (e.g., the origin of the fiber cable, a service garage, and/or the like). In this way, measurement platform 515 may quickly provide directions to a technician or a vehicle for repairing the one of the fiber cables, which conserves resources that would otherwise have been wasted in providing incorrect directions to the technician or the autonomous vehicle, causing the technician or the autonomous vehicle to travel based on the incorrect directions, and/or the like.

In some implementations, the one or more actions may include measurement platform 515 generating a user interface that includes the geographic coordinate data associated with the alarm condition (or an indication of the geographic coordinate data). For example, measurement platform 515 may provide a user interface that includes a map interface that includes an indication at the location of the geographic coordinate data on the map interface. The user interface may be provided on measurement platform 515 or over network 501 to a connected device, such as a mobile device associated with a technician so that the technician may utilize the user interface to quickly navigate to the geographic location associated with the alarm condition for servicing the one of the fiber cables. In this way, measurement platform 515 may enable expedited servicing of the one of the fiber cables, thereby conserving resources (e.g., computing resources, networking resources, and/or the like) that would otherwise have been wasted in scheduling a repair service, assigning a technician for the repair service, determining the correct location for the technician to inspect, and/or the like.

In some implementations, the one or more actions may include measurement platform 515 logging the alarm condition and the geographic coordinate data associated with the alarm condition, and/or providing a notification of the alarm condition with the geographic coordinate data. For example, measurement platform 515 may store in a logging system data structure a log event that includes an indication of the alarm condition and the geographic coordinates, which may include date/time information, device/platform information, or other information. Additionally, or alternatively, measurement platform 515 may provide a notification (e.g., a message) to an administrator (or a notification platform that provides notifications to administrators) that includes that alarm condition and the geographic coordinates (or, in some implementations, a link to the logging system data structure). In this way, measurement platform 515 may enable correlation of the alarm event with other alarm conditions, historical analysis of alarm conditions and administrative notification of alarm conditions, thereby conserving resources (e.g., computing resources, networking resources, and/or the like) that would otherwise have been wasted in scheduling a repair service, assigning a technician for the repair service, and/or the like.

In some implementations, measurement platform 515 may part of an alarm mitigation system and method that allows for automated alarm mitigation using the geographic location correlations described herein. For example, in a large network having many fiber optic cables, multiple sensor devices 505 may be deployed to monitor the collection of fiber optic cables deployed in the network. When one or more alarm conditions are detected, measurement platform 515 may be provided with information associated with the alarm conditions, such as the network elements impacted by the alarms and/or the fiber cables impacted by the alarms. Measurement platform 515 may instruct sensor device(s) 505 associated with the fiber cable(s) impacted by the alarms to perform distance measurements to detect the cable distance to the potential alarm condition. Sensor device(s) 505 may perform the distance measurements and provide the cable distance measurements to the alarm conditions to measurement platform 515. Measurement platform 515 may then use the cable distance measurements to the alarm conditions to determine geographic coordinate data of the alarm conditions. In some cases, two sensor devices 505 will be instructed to perform measurements (e.g., a sensor device 505 at each end of a fiber cable associated with an alarm, a sensor device each at one end of two different fiber cables both with alarm conditions). Upon receiving the geographic coordinate data of the alarm conditions from each sensor device 505, measurement platform 515 may determine that multiple alarm conditions are located at the same geographic location (for example, a fiber cut at a geographic location having multiple co-located fiber cables). Measurement platform 515 may provide logging, notifications, displays, and mitigation activities of the alarm conditions (as described above) as a single alarm event at the geographic coordinates, rather than multiple alarm events, which may avoid multiple investigation/mitigation processes.

As indicated above, FIGS. 5A-5H, 6, 7 and 8A-8C are provided merely as examples. Other examples may differ from what was described with regard to FIGS. 5A-5H, 6, 7 and 8A-8C. The number and arrangement of devices and networks shown in FIGS. 5A-5H, 6, 7 and 8A-8C are provided as an example. In practice, there may be additional devices and/or networks, fewer devices and/or networks, different devices and/or networks, or differently arranged devices and/or networks than those shown in FIGS. 5A-5H, 6, 7 and 8A-C. Furthermore, two or more devices shown in FIGS. 5A-5H, 6, 7 and 8A-8C may be implemented within a single device, or a single device shown in FIGS. 5A-5H, 6, 7 and 8A-8C may be implemented as multiple, distributed devices. Additionally, or alternatively, a set of devices (e.g., one or more devices) of FIGS. 5A-5H, 6, 7 and 8A-8C may perform one or more functions described as being performed by another set of devices of FIGS. 5A-5H, 6, 7 and 8A-8C.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
sending, by a device, to a first sensor device associated with a first fiber cable and a second sensor device associated with a second fiber cable, a request indicating the first sensor device and the second sensor device to begin a continuous measurement mode,
wherein the first sensor device and the second sensor device each include a distributed optical fiber sensing device, an optical reflectometry device, and a sensor device network interface to communicatively connect to a network,
wherein the distributed optical fiber sensing device includes a scattering-based distributed acoustic sensing device, and
wherein the request causes the first sensor device and the second sensor device to perform continuous measurements by taking a measurement periodically over a particular time period;
receiving, by the device, from the first sensor device and the second sensor device over the network, based on validation of cable distance data associated with the first fiber cable and the second fiber cable, and based on a value associated with the cable distance data being determined to be deviating from a maximum cable length, the cable distance data identifying at least one cable distance along the first fiber cable and the second fiber cable corresponding to at least one vibration experienced by the first fiber cable and the second fiber cable,
wherein a vibration platform, that is deployed along a deployed route of the first fiber cable and the second fiber cable, generates the at least one vibration along the deployed route of the first fiber cable and the second fiber cable, and
wherein the validation of the cable distance data comprises confirming that the cable distance data is associated with the at least one vibration by determining that a difference between more than one measurement of the at least one cable distance, measured at least at a first time and a second time, is within a threshold;
receiving, by the device and from the vibration platform over the network, location data identifying at least one location associated with the at least one vibration, the location data including geographic coordinate data associated with the at least one vibration;
correlating, by the device, the cable distance data and the location data to generate correlated data that includes the geographic coordinate data;
storing, by the device, the correlated data in a data structure associated with the device;
receiving, by the device and from the first sensor device and the second sensor device, data identifying a first cable distance along the first fiber cable to a first alarm condition associated with the first fiber cable, and data identifying a second cable distance along the second fiber cable to a second alarm condition associated with the second fiber cable;
determining, by the device, first geographic coordinate data of a first location of the first alarm condition based on the correlated data and the data identifying the first cable distance, and second geographic coordinate data of a second location of the second alarm condition based on the correlated data and the data identifying the second cable distance;
determining, by the device, that the first geographic coordinate data and the second geographic coordinate data represent the same location;
performing, by the device, one or more actions based on the geographic coordinate data of the alarm condition, wherein the one or more actions include providing a notification that the first alarm condition and the second alarm condition are co-located;
identifying, by the device, a third fiber cable that is available and able to handle network traffic associated with the first fiber cable or the second fiber cable; and
redirecting, by the device, the network traffic to the third fiber cable.

2. The method of claim 1, wherein the geographic coordinate data includes latitude and longitude coordinates.

3. The method of claim 1, wherein correlating the cable distance data and the geographic coordinate data includes:
correlating a distance measurement of the cable distance data and the geographic coordinate data of the location data when a timestamp of the cable distance data matches a timestamp of the location data.

4. The method of claim 1, wherein the first fiber cable and the second fiber cable are associated with communications traffic during the at least one vibration.

5. The method of claim 1, wherein:
the cable distance data includes at least one of:
a cable identifier for the first fiber cable and the second fiber cable,
a sensor identifier for the first sensor device and the second sensor device, or
a timestamp associated with the at least one cable distance; and
the location data includes at least one of:
a platform identifier for the vibration platform, or
a timestamp associated with the geographic coordinate data.

6. The method of claim 1, wherein the one or more actions comprises:
determining routing directions to the location of the alarm condition based on a selected start location; and
providing the routing directions to an autonomous vehicle based on the location of the alarm condition.

7. A device, comprising:
one or more processors configured to:
send, to a first sensor device associated with a first fiber cable and a second sensor device associated with a second fiber cable, a request indicating the first sensor device and the second sensor device begin a continuous measurement mode,
  wherein the first sensor device and the second sensor device each include a distributed optical fiber sensing device, an optical reflectometry device, and a sensor device network interface to communicatively connect to a network,
  wherein the distributed optical fiber sensing device includes a scattering-based distributed acoustic sensing device, and
  wherein the request causes the first sensor device and the second sensor device to perform continuous measurements by taking a measurement periodically over a time period;
receive, from the first sensor device and the second sensor device over the network, based on validation of cable distance data associated with the first fiber cable and the second fiber cable, and based on a value associated with the cable distance data being determined to be less than a maximum cable length, the cable distance data identifying at least one cable distance along the first fiber cable and the second fiber cable corresponding to at least one vibration experienced by the first fiber cable and the second fiber cable,
  wherein a vibration platform, that is deployed along a deployed route of the first fiber cable and the second fiber cable, generates the at least one vibration along the deployed route of the first fiber cable and the second fiber cable, and
  wherein the validation of the cable distance data comprises confirming that the cable distance data is associated with the at least one vibration by determining that a difference between more than one measurement of the at least one cable distance, measured at least at a first time and a second time, is within a threshold;
receive, from the vibration platform over the network, location data identifying at least one location associated with the at least one vibration, the location data including geographic coordinate data associated with the at least one vibration;
correlate the cable distance data and the location data to generate correlated data, the correlated data that includes the geographic coordinate data;
store the correlated data in a data structure associated with the device;
receive, from the first sensor device and the second sensor device, data identifying a first cable distance along the first fiber cable to a first alarm condition associated with the first fiber cable, and data identifying a second cable distance along the second fiber cable to a second alarm condition associated with the second fiber cable;
determine first geographic coordinate data of a first location of the first alarm condition based on the correlated data and the data identifying the first cable distance, and second geographic coordinate data of a second location of the second alarm condition based on the correlated data and the data identifying the second cable distance;
determine that the first geographic coordinate data and the second geographic coordinate data represent the same location;
perform one or more actions based on the geographic coordinate data of the alarm condition,
  wherein the one or more actions include providing a notification that the first alarm condition and the second alarm condition are co-located;
identify a third fiber cable that is available and able to handle network traffic associated with the first fiber cable or the second fiber cable; and
redirect the network traffic to the third fiber cable.

8. The device of claim 7, wherein the geographic coordinate data includes latitude and longitude coordinates.

9. The device of claim 7, wherein the one or more processors, to correlate the cable distance data and the geographic coordinate data, are configured to:
correlate a distance measurement of the cable distance data and the geographic coordinate data of the location data when a timestamp of the cable distance data matches a timestamp of the location data.

10. The device of claim 7, wherein the cable distance data includes at least one of:
a cable identifier for the first fiber cable and the second fiber cable,
a sensor identifier for the first sensor device and the second sensor device, or
a timestamp associated with the at least one cable distance; and
wherein the location data includes at least one of:
a platform identifier for the vibration platform, or
a timestamp associated with the geographic coordinate data.

11. The device of claim 7, wherein the one or more actions comprises:
determining routing directions to the location of the alarm condition based on a selected start location; and
providing the routing directions to an autonomous vehicle based on the location of the alarm condition.

12. The device of claim 7, wherein the request comprises information associated with a duration of the time period and information associated with a periodicity for the sensor device to perform measurements periodically.

13. The device of claim 7, wherein the one or more processors are further configured to:
determine, based on the correlated data, a geographic location that is closest to the geographic coordinate data of the alarm condition; and
provide a particular cable distance that represents a distance away from the geographic location.

14. A system, comprising:
a first sensor device associated with a first fiber cable and a second sensor device associated with a second fiber cable each including a distributed optical fiber sensing device, an optical reflectometry device, and a sensor device network interface to communicatively connect to a network,
  wherein the distributed optical fiber sensing device includes a scattering-based distributed acoustic sensing device;
a vibration platform that is deployed along a deployed route of the first fiber and the second fiber cable,
  wherein the vibration platform generates at least one vibration along the deployed route of the first fiber cable and the second fiber cable;
a measurement platform including a device comprising one or more processors configured to:
send to the first sensor device and the second sensor device, a request indicating the first sensor device and the second sensor device to begin a continuous measurement mode, wherein the request causes the first sensor device and the second sensor device to perform continuous measurements by taking a measurement periodically over a particular time period;
receive, from the first sensor device and the second sensor device over the network, based on validation of cable distance data associated with the first fiber cable and the second fiber cable, and based on a value associated with the cable distance data being determined to be deviating from a maximum cable length, the cable distance data identifying at least one cable distance along the first fiber cable and the second fiber cable corresponding to at least one vibration experienced by the first fiber cable and the second fiber cable,
wherein the validation of the cable distance data comprises confirming that the cable distance data is associated with the at least one vibration by determining that a difference between more than one measurement of the at least one cable distance, measured at least at a first time and a second time, is within a threshold;
receive, from the vibration platform over the network, location data identifying at least one location associated with the at least one vibration, the location data including geographic coordinate data associated with the at least one vibration;
correlate the cable distance data and the location data to generate correlated data that includes the geographic coordinate data;
store the correlated data in a data structure associated with the device;
receive, by the device and from the first sensor device and the second sensor device, data identifying a first cable distance along the first fiber cable to a first alarm condition associated with the first fiber cable, and data identifying a second cable distance along the second fiber cable to a second alarm condition associated with the second fiber cable;
determine first geographic coordinate data of a first location of the first alarm condition based on the correlated data and the data identifying the first cable distance, and second geographic coordinate data of a second location of the second alarm condition based on the correlated data and the data identifying the second cable distance;
determine that the first geographic coordinate data and the second geographic coordinate data represent the same location;
perform one or more actions based on the geographic coordinate data of the alarm condition,
wherein the one or more actions include providing a notification that the first alarm condition and the second alarm condition are co-located;
identify a third fiber cable that is available and able to handle network traffic associated with the first fiber cable or the second fiber cable; and
redirect the network traffic to the third fiber cable.

15. The system of claim 14, wherein the geographic coordinate data includes latitude and longitude coordinates.

16. The system of claim 14, wherein correlating the cable distance data and the geographic coordinate data includes:
correlating a distance measurement of the cable distance data and the geographic coordinate data of the location data when a timestamp of the cable distance data matches a timestamp of the location data.

17. The system of claim 14, wherein the first fiber cable and the second fiber cable are associated with communications traffic during the at least one vibration.

18. The system of claim 14, wherein:
the cable distance data includes at least one of:
a cable identifier for the first fiber cable and the second fiber cable,
a sensor identifier for the first sensor device and the second sensor device, or
a timestamp associated with the at least one cable distance; and
the location data includes at least one of:
a platform identifier for the vibration platform, or
a timestamp associated with the geographic coordinate data.

19. The system of claim 14, wherein the one or more actions comprises:
determining routing directions to the location of the alarm condition based on a selected start location; and
providing the routing directions to an autonomous vehicle based on the location of the alarm condition.

20. The system of claim 14, wherein the request comprises information associated with a duration of the time period and information associated with a periodicity for the sensor device to perform measurements periodically.

* * * * *